US007235186B2

(12) United States Patent
Ochs et al.

(10) Patent No.: US 7,235,186 B2
(45) Date of Patent: Jun. 26, 2007

(54) ORGANOSILICON COMPOUNDS COMPRISING CYCLODEXTRIN RADICALS

(75) Inventors: Christian Ochs, Burghausen (DE); Peter Habereder, Krailing (DE); Gloria Kaluza, Burghausen (DE)

(73) Assignee: Wacker Chemie AG, Munich (DE)

( * ) Notice: Subject to any disclaimer, the term of this patent is extended or adjusted under 35 U.S.C. 154(b) by 180 days.

(21) Appl. No.: 10/523,909

(22) PCT Filed: Aug. 14, 2003

(86) PCT No.: PCT/EP03/09053

§ 371 (c)(1),
(2), (4) Date: Feb. 8, 2005

(87) PCT Pub. No.: WO2004/018547

PCT Pub. Date: Mar. 4, 2004

(65) Prior Publication Data

US 2006/0009592 A1    Jan. 12, 2006

(30) Foreign Application Priority Data

Aug. 23, 2002  (DE) ................................ 102 38 818

(51) Int. Cl.
*C08G 77/22* (2006.01)
*C08L 83/06* (2006.01)
*D06M 13/513* (2006.01)
(52) U.S. Cl. ..................... 252/8.63; 525/477; 525/479; 528/25; 528/27; 528/28; 528/34
(58) Field of Classification Search ..................... None
See application file for complete search history.

(56) References Cited

U.S. PATENT DOCUMENTS

| 5,104,547 | A | * | 4/1992 | Cabrera et al. ............. 210/656 |
| 5,268,442 | A | | 12/1993 | Bradshaw et al. |
| 5,403,898 | A | | 4/1995 | Bradshaw et al. |

FOREIGN PATENT DOCUMENTS

| DE | 42 08 402 A1 | 9/1993 |
| DE | 43 24 636 A1 | 5/1994 |
| DE | 195 20 967 A1 | 12/1996 |
| DE | 195 20 989 A1 | 12/1996 |
| DE | 198 31 073 A1 | 1/2000 |
| EP | 0 586 322 A1 | 3/1994 |
| FR | 2806929 A1 * | 10/2001 |
| JP | 7-25203 | 10/1995 |
| PL | 178362 | 12/1996 |
| WO | WO 96/31540 | 10/1996 |

OTHER PUBLICATIONS b-Cyclodextrin Chiral Stationary Phases for Liquid Chromatography. Effect of the Spacer Arm on Chiral Recognition authored by Berthod et al and published in Talanta (1993), 40(9), 1367-73.*
"Molecular Host Siloxane Thin Film for Surface Acoustic Wave Chemical Sensors" authored by Swanson et al. and published in Sensors and Actuators (1997), B45, pp. 79-84.*
Derwent Abstract Corresponding to DE 195 20 967 A1.
Derwent Abstract Corresponding to DE 43 24 636 A1.
Derwent Abstract Corresponding to DE 198 31 073 A1.
Derwent Abstract Corresponding to DE 195 20 989 A1.
Derwent Abstract Corresponding to DE 42 08 402 A1.
Derwent Abstract Corresponding to EP 0 586 322 A1.
Derwent Abstract Corresponding to PL 178362 B1.
Derwent Abstract Corresponding to WO 96/31540.
Derwent Abstract Corresponding to JP 7-252303.
Yi et al., "New Permethyl-Substituted B-Cyclodextrin Polysiloxanes for Use as Chiral Stationary Phases in Open Tubular Column Chromatography", J. Org. Chem. 1993, vol. 58, pp. 4844-4850.
Abstract CAS. Online, Journal of Microcolumn Separations (1996), vol. 8(4), pp. 249-257.
Abstract CAS. Online, Journal of Microcolumn Separations (2000), vol. 12(9), pp. 475-481.
Abstract CAS -Online, Annals of West University of Timisoara, Series of Chemistry (1996), vol. 5, pp. 43-48.
M. Ben Ali et al., "Cyclodextrin-polymethylhydrosiloxane gel as sensitive membrane for heavy ion sensors"; Materials Science and Engineering C6 (1998), pp. 53-58.
S. K. Young et al., "Cyclodextrin based Polymers: Nanomaterials With Built-In Scavening Capabilities"; Polymer Preprints 2001, vol. 42(2), 162-163.
M. Tanaka et al., "Applicability of Modified B-Cyclodextrin Stationary Phases for Gas Chromatography"; Anal Chem. (1983), vol. 316, pp. 54-55.

* cited by examiner

*Primary Examiner*—Marc S. Zimmer
(74) *Attorney, Agent, or Firm*—Brooks Kushman P.C.

(57) ABSTRACT

Cyclodextrinyl group-containing organosilicon compounds contain cyclodextrin or cyclodextrin derivatives bonded to an organosilicon moiety through a divalent linking group. The compounds are easily prepared in high yield by reaction of reactive cyclodextrin or cyclodextrin derivatives with an organosilicon compound reactive therewith. The compounds have numerous uses, including treatment of organic fibers to provide long lasting fragrances or freshness characteristics.

24 Claims, No Drawings

ORGANOSILICON COMPOUNDS COMPRISING CYCLODEXTRIN RADICALS

BACKGROUND OF THE INVENTION

1. Field of the Invention

This invention concerns cyclodextrinyl-containing organosilicon compounds, their preparation, their use, especially in textile finishing, and also crosslinkable compositions based on cyclodextrinyl-containing organosilicon compounds.

2. Description of the Related Art

Organosilicon compounds, especially organosilanes and organosiloxanes, are well known and widely used, for example as a softener.

Cyclodextrins are cyclic oligosaccharides constructed of 6, 7 or 8 α-(1-4)-linked anhydroglycose units. α-, β- and γ-Cyclodextrins prepared by enzymatic starch conversion differ in the diameter of their hydrophobic cavity and are generally useful for inclusion of numerous lipophilic substances.

Cyclodextrin derivatives are prepared by chemical modification of the OH groups of cyclodextrin. Examples of modifying chemistries are hydroxypropylation using propylene oxide and methylation using methyl halides. The cyclodextrin derivatives thus obtained are significantly more soluble in water than native cyclodextrins and are capable of solubilizing inherently water-insoluble, hydrophobic substances in an aqueous medium by inclusion and formation of water-soluble complexes. DE-A 195 20 967 describes reactive cyclodextrin derivatives with at least one nitrogenous heterocycle which are useful for finishing textile materials or leather. Whereas unsubstituted or methyl- or hydroxypropyl-substituted cyclodextrins can only be fixed on textile substrates with the aid of binder systems, the monochlorotriazine derivative is (completely analogously to reactive dyes) capable of forming a genuine covalent bond with the OH groups of the cellulosic textile substrate. However, this generally requires "dyeing conditions"; that is, cellulose is generally only efficiently reactive for entering this bond after activation with alkali at elevated temperature. The hydrolysis of the chlorotriazine radical occurs as a competing reaction. It is known from the dyeing arts that reactive dyes therefore usually only go on in a 50% yield or so, the other half being lost through hydrolysis. A similar ratio is likely when reacting a cellulosic textile substrate with a monochlorotriazine-functional cyclodextrin.

Organosilicon compounds having covalently attached cyclodextrin residues are known in the field of chromatographic separation analysis. The cyclodextrin-containing polymers immobilized on a carrier material such as silica gel, serve especially as chiral stationary phases for enantiomer separation of organic compounds. In addition, specific siloxane-cyclodextrin copolymers find use as contact lens material or in ion-sensitive electrodes. See for example DE-A-43 24 636, U.S. Pat. Nos. 5,268,442, 5,403,898 and EP-A 586 322. All cases involve time-consuming multistep syntheses based on hydrosilylation reactions, which give desired materials in a low yield only.

Block copolymers having cyclodextrin in the polymer chain are known. The copolymers can be formed in two ways. M. B. Ali et al., Mater. Sci. Eng. C 1998, C6, 53 react one or more hydroxyl groups of the cyclodextrin molecule directly with hydromethylsiloxy-containing polyorganosiloxanes by elimination of hydrogen. The materials obtained find application as membrane gels in ion-sensitive electrodes. Maciejewski et al. PL-B-178362, by contrast, prefer the polycondensation of OH-containing cyclodextrin derivatives with chlorosilanes which proceeds with HCl elimination. Both approaches lead to the formation of cyclodextrin-silicone block copolymers in which the cyclodextrin molecule is an integral constituent of the polymer network and acts as a bonding link or branching site between siloxane blocks. The SiOC linkage means that the copolymers are not stable to hydrolysis under nonneutral conditions. Further disadvantages of the processes mentioned are first, the release of hydrogen, which entails appreciable problems on an industrial scale, and also in the case of PL-B-178362, a nonuniform copolymeric composition, which is solely controlled by statistical effects.

As well as the processes mentioned above, there are isolated examples of linkages via carboxylic or carbonic acid derivatives in the literature. Similarly, acid-catalyzed epoxide-ring opening via the hydroxyl groups of the cyclodextrin molecule has already been described in the past. Examples are S. K. Young et al. (Polym. Prepr. 2001, 42, 162), M. Tanaka et al. (Fresenius Z. Anal. Chem. 1983, 316, 54) and also DE-A-42 08 402. Cost-intensive reagents as well as multistep synthetic processes are again disadvantages.

SUMMARY OF THE INVENTION

The present invention provides organosilicon compounds containing moieties to which derivatized or underivatized cyclodextrins are bonded through an intermediary divalent, optionally substituted hydrocarbyl radical. The cyclodextrin-containing organosilicon compounds are readily synthesized by reacting a cyclodextrin bearing a reactive group with an organosilicon compound bearing an interreactive functional group.

The present invention provides cyclodextrinyl-containing organosilicon compounds comprising units of the formula $$A_a R_b X_c H_d SiO_{(4-a-b-c-d)/2} \quad (I)$$

where

A may in each occurrence be the same or different and is a radical of the formula $$CD-R^2- \quad (II)$$

where

CD is a mono- or multivalent, derivatized or undederivatized cyclodextrin residue and $R^2$ is a divalent, substituted or unsubstituted hydrocarbyl radical which may be interrupted by oxygen or by mercapto, amine, carbonyl, carboxyl, sulfoxide or sulfonyl groups, R may in each occurrence be the same or different and is a substituted or unsubstituted hydrocarbyl radical which may be interrupted by oxygen atoms, sulfur atoms and/or nitrogen atoms, X may in each occurrence be the same or different and is a radical of the formula $-OR^1$ where $R^1$ is a hydrogen atom or substituted or unsubstituted hydrocarbyl with or without substitution by ether oxygen atoms, a is 0, 1 or 2, preferably 0 or 1, b is 0, 1, 2 or 3, c is 0, 1, 2 or 3, preferably 0 or 1, and d is 0, 1, 2 or 3, preferably 0, with the proviso that the sum a+b+c+d is ≦4, the organosilicon compound has at least one A radical per molecule, not more than 90% of the units of the formula (I), preferably not more than 50%, more preferably not more than 30% and especially none of the units of the formula (I) has the sum of a+b+c+d being equal 0, organosilicon compounds of the formula (I) where a+b+c+d=4 cannot have $R^2$ being triazinylene, organosilicon compounds consisting of units of the formula (I) where a+b+c+d≦3 cannot have $R^2$ being an α-carboxylic acid or α-carbonic acid derivative (such as carboxylate ester, thiolcarboxylate ester, carboxamide, thiolcarboxamide, urethane, S-thiourethane or urea derivative) which is purely aliphatic, i.e., constructed exclusively of carbon-carbon single bonds, and attached through ω-SiC to the organosilicon compound, organosilicon compounds consisting of units of formula (I) where a+b+c+d≦3 cannot have $R^2$ being divalent hydrocarbyl selected from the group consisting of $-CH_2-CHOH-CH_2-O-(CH_2)_3-$, $-(CH_2)_e-$, $-Ar-(CH_2)_e-$, $-Ar-O-(CH_2)_e-$, $-Ar-S-(CH_2)_e-$, $-Ar-NH-(CO)-(CH_2)_e-$ or $-(CO)-Ar-O-(CH_2)_e-$, where e is 0-16 and Ar is a phenylene, pyridylene or furanylene radical, wherein the cyclodextrin oxygen atom used for the chemical attachment of CD to $R^2$ may be replaced by S, NH or $NR^0$ where $R^0$ has one of the meanings indicated above for R.

As used herein, organopolysiloxanes shall comprehend dimeric as well as oligomeric and polymeric siloxanes.

The organosilicon compounds of the present invention may be not only silanes, i.e., compounds of the formula (I) where a+b+c+d=4, but also siloxanes, i.e., compounds comprising units of the formula (I) where a+b+c+d≦3. The organosilicon compounds of the present invention are preferably organopolysiloxanes, especially organopolysiloxanes consisting of units of the formula (I).

Examples of R radicals are alkyl radicals, such as methyl, ethyl, n-propyl, isopropyl, 1-n-butyl, 2-n-butyl, isobutyl, tert-butyl, n-pentyl, isopentyl, neopentyl, tert-pentyl; hexyl radicals, such as n-hexyl; heptyl radicals, such as n-heptyl; octyl radicals, such as n-octyl and isooctyl, such as the 2,2,4-trimethylpentyl radical; nonyl radicals, such as n-nonyl; decyl radicals, such as n-decyl; dodecyl radicals, such as n-dodecyl; octadecyl radicals, such as n-octadecyl; cycloalkyl radicals, such as cyclopentyl, cyclohexyl, cycloheptyl and methylcyclohexyl; alkenyl radicals, such as vinyl, 1-propenyl and 2-propenyl; aryl radicals, such as phenyl, naphthyl, anthryl and phenanthryl; alkaryl radicals, such as o-, m-, p-tolyl; xylyl radicals and ethylphenyl radicals; and aralkyl radicals, such as benzyl, α-phenylethyl and β-phenylethyl.

Examples of substituted R radicals are haloalkyl radicals, such as 3,3,3-trifluoro-n-propyl, 2,2,2,2',2',2'-hexafluoroisopropyl, heptafluoroisopropyl and haloaryl radicals, such as o-, m- and p-chlorophenyl, aminoalkyl radicals, such as aminopropyl, aminoethylaminopropyl, cyclohexylaminopropyl, dimethylaminopropyl, diethylaminopropyl or acetylated aminopropyl radicals, hydroxyl-functional radicals, such as those of primary, secondary or tertiary alcohols, examples being 3-hydroxypropyl and 4-hydroxybutyl, or such as those of aromatic alcohols, as of phenol or eugenol for example, mercapto-functional radicals, such as 3-mercaptopropyl, carboxyl-functional radicals and also their derivatives or salts, such as the acetic acid, 3-carboxypropyl, 4-carboxybutyl, 10-carboxydecyl, 3-(2,5-dioxotetrahydrofuranyl)propyl, 3-(ethane-1,2-dicarboxyl)propyl, 3-acryloyloxypropyl, 3-methacryloyloxypropyl or undecenesilyl ester radical, epoxy-functional radicals of the group consisting of

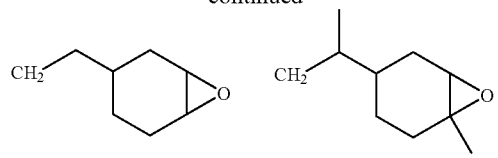

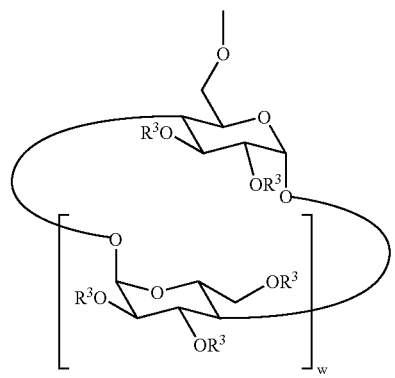

carbonyl-functional radicals such as the propionaldehyde radical, polyglycol-functional radicals, for example alkylpolyglycol radicals, such as the propylpolyglycol radical, phosphonato-functional radicals, such as for example phosphonatoalkyl radicals, silalactone-functional radicals, glycoside-functional radicals, such as for example those where the glycoside radical, which may be constructed from 1 to 10 monosaccharide units, is attached via an alkylene or oxyalkylene spacer, and also the radicals mentioned in EP-A-612 759 at page 2 line 11 to page 3 line 53.

R is preferably an unsubstituted or hydroxyl-, mercapto-, amine-, carbonyl-, carboxyl- or oxiranyl-substituted hydrocarbyl radical having 1 to 18 carbon atoms; R is more preferably an unsubstituted or hydroxyl-, mercapto-, amine-, carbonyl-, carboxyl- or oxiranyl-substituted hydrocarbyl radical having 1 to 11 carbon atoms; and R is especially selected from the group consisting of methyl, hydroxypropyl, mercaptopropyl, 3-glycidoxypropyl, aminopropyl, aminoethylaminopropyl, 10-carboxydecyl, 3-acryloyloxypropyl and 3-methacryloyloxypropyl.

When the organosilicon compounds of the present invention are organopolysiloxanes, not less than 50% and more preferably not less than 90% of all R radicals are methyl radicals.

Examples of $R^1$ radicals are the examples indicated for R. $R^1$ is preferably a hydrogen atom or an alkyl radical having 1 to 8 carbon atoms and more preferably a hydrogen atom, methyl or ethyl.

X is preferably hydroxyl, methoxy or ethoxy.

The CD radicals may be any desired and any previously known cyclodextrin or cyclodextrin derivative in which one or more oxygen-bonded hydrogen atoms are replaced by a chemical bond. The CD radicals preferably have the general formula where $R^3$ in each occurrence may be the same or different and represents a hydrogen atom, a monovalent radical where R is as defined or a divalent radical where $R^2$ is as defined and w is 5, 6 or 7.

The radical $R^3$ is preferably a hydrogen atom, an unsubstituted or amine-, carbonyl-, carboxyl- or oxiranyl-substituted mono- or multivalent hydrocarbyl radical, a polyether radical with or without hydroxyl, mercapto, amine, ammonium, carbonyl, carboxyl, oxiranyl or reactive sulfonic acid derivative groups substitution, or a halotriazine-functional radical.

The radical $R^3$ is more preferably a hydrogen atom, a monovalent alkyl radical, acetyl radical, amino-, epoxy-, vinylsulfonyl-, 2-sulfooxyethylsulfonyl-2, -chloroethylsulfonyl- and (meth)acryloyl-functional alkyl or polyether radical and also a halotriazine-functional radical, $R^3$ being especially a hydrogen atom, methyl, ethyl, propyl, acetyl, β-aminoethyl, β-(N-methyl)aminoethyl, γ-aminopropyl, γ-(N-tert-butyl)-amino-2-hydroxypropyl, γ-(N-cyclohexyl) amino-2-hydroxypropyl, glycidoxypropyl, 3-(vinylsulfonyl) propyl, vinylsulfonyl, (2-sulfooxyethyl)sulfonyl, (2-chloroethyl)sulfonyl, p-vinylsulfonylphenyl, p-(2-sulfooxyethyl) sulfonylphenyl, ω-vinylsulfonoylpolyoxypropyl, acryloyl, 2-(N-acrylamido)ethyl, 3-(N-acrylamido)-propyl, 2-hydroxy-3-methacryloyloxypropyl and 4-chloro-6-ONa-triazinyl.

Examples of $R^2$ are $-C_3H_6-O-CH_2-CHOH-CH_2-$, $-C_3H_6-O-(C_2H_4O)_{10}-CH_2-CHOH-CH_2-$, $-C_3H_6-O-C_6H_{10}O_4-O-CH_2-CHOH-CH_2-$, $-C_3H_6-C_6H_4(OCH_3)-O-CH_2-CHOH-CH_2-$, $-C_3H_6-S-CH_2-CHOH-CH_2-$, $-C_3H_6-NH-CH_2-CHOH-CH_2-$, $-C_3H_6-NH-C_2H_4-NH-CH_2-CHOH-CH_2-$, $-C_{10}H_{20}-COO-CH_2-CHOH-CH_2-$, $-C_3H_6-NH-CH_2-CHOH-CH_2-O-C_3H_6-$, $-C_3H_6-NH-C_2H_4-NH-CH_2-CHOH-CH_2-O-C_3H_6-$, $-C_3H_6-O-CH_2-CHOH-CH_2-NH-C_2H_4-$, $-C_3H_6-O-CH_2-CHOH-CH_2H_2-N(CH_3)-C_2H_4-$, $-C_3H_6-O-CH_2-CHOH-CH_2-NH-C_3H_6-$, $-C_3H_6-O-CH_2-CHOH-CH_2-NH-CH_2-CHOH-CH_2-$, $-C_3H_6-O-CH_2-CHOH-CH_2-N(t-Bu)-CH_2-CHOH-CH_2-$, $-C_3H_6-O-CH_2-CHOH-CH_2-N(C_6H_{11})-CH_2-CHOH-CH_2-$, $-C_3H_6-O-(CO)-CH_2-CH_2-NH-CH_2-CHOH-CH_2-$, $-C_3H_6-O-(CO)-CH(CH_3)-CH_2-NH-CH_2-CHOH-CH_2-$, $-C_3H_6-O-CH_2-CH_2-(CO)NH-C_2H_4-$, $-C_3H_6-S-CH_2-CH_2-(CO)NH-C_2H_4-$, $-C_3H_6-NH-CH_2-CH_2-(CO)NH-C_2H_4-$, $-C_3H_6-NH-C_2H_4-CH_2-CH_2-(CO)NH-C_2H_4-$, $-C_{10}H_{20}-COO-CH_2-CH_2-(CO)NH-C_2H_4-$, $-C_3H_6-C_6H_4(OCH_3)-O-CH_2-CH_2-(CO)NH-C_2H_4-$, $-C_3H_6-O-C_6H_{10}O_4-O-CH_2-CH_2-(CO)NH-C_2H_4-$, $-C_3H_6-O-CH_2-CH_2-(CO)NH-C_3H_6-$, $-C_3H_6-S-CH_2-CH_2-(CO)NH-C_3H_6-$, $-C_3H_6-NH-CH_2-CH_2-(CO)NH-C_3H_6-$, $-C_3H_6-NH-C_2H_4-CH_2-CH_2-(CO)NH-C_3H_6-$, $-C_{10}H_{20}-COO-CH_2-CH_2-(CO)NH-C_3H_6-$, $-C_3H_6-C_6H_4(OCH_3)-O-CH_2-CH_2-(CO)NH-C_3H_6-$, $-C_3H_6-O-C_6H_{10}O_4-O-CH_2-CH_2-(CO)NH-CH_2-CHOH-CH_2-$, $-C_3H_6-O-CH_2-CH_2-(CO)NH-CH_2-CHOH-CH_2-$, $-C_3H_6-S-CH_2-CH_2-(CO)NH-CH_2-CHOH-CH_2-$, $-C_3H_6-NH-CH_2-CH_2-(CO)NH-CH_2-CHOH-CH_2-$, $-C_3H_6-NH-C_2H_4-CH_2-CH_2-(CO)NH-CH_2-CHOH-CH_2-$, $-C_{10}H_{20}-COO-CH_2-CH_2-(CO)NH-CH_2-CHOH-CH_2-$, $-C_2H_4-C_6H_4(CH_3)-O-CH_2-CH_2-(CO)NH-CH_2-CHOH-CH_2-$, $-C_3H_6-O-C_6H_{10}O_4-O-CH_2-CH_2-(CO)NH-CH_2-CHOH-CH_2-$, $-C_3H_6-O-CH_2-CH_2-COO-C_3H_6-$, $-C_3H_6-S-CH_2-CH_2-COO-C_3H_6-$, $-C_3H_6-NH-CH_2-CH_2-COO-C_3H_6-$, $-C_3H_6-NH-C_2H_4-CH_2-CH_2-COO-C_3H_6-$, $-C_{10}H_{20}-COO-CH_2-CH_2-COO-C_3H_6-$, $-C_3H_6-C_6H_4(OCH_3)-O-CH_2-CH_2-COO-C_3H_6-$, $-C_3H_6-O-C_6H_{10}O_4-O-CH_2-CH_2-COO-C_3H_6-$, $-C_3H_6-O-CH_2-CH_2-COO-CH_2-CHOH-CH_2-(OC_3H_6)_{0-10}-$, $-C_3H_6-S-CH_2-CH_2-COO-CH_2-CHOH-CH_2-(OC_3H_6)_{0-10}-$, $-C_3H_6-NH-CH_2-CH_2-COO-CH_2-CHOH-CH_2-(OC_3H_6)_{0-10}-$, $-C_3H_6-NH-C_2H_4-CH_2-CH_2-COO-CH_2CHOH-CH_2-(OC_3H_6)_{0-10}-$, $-C_{10}H_{20}-COO-CH_2-CH_2-COO-CH_2-CHOH-CH_2-(OC_3H_6)_{0-10}-$, $-C_3H_6-C_6H_4 (OCH_3)-O-CH_2-CH_2-COO-CH_2-CHOH-CH_2-(OC_3H_6)_{0-10}-$, $-C_3H_6-O-C_6H_{10}O_4-O-CH_2-CH_2-COO-CH_2-CHOH-CH_2-(OC_3H_6)_{0-10}-$, $-C_3H_6-O-CH_2-CH(CH_3)-(CO)NH-C_2H_4-$, $-C_3H_6-S-CH_2-CH(CH_3)-(CO)NH-C_2H_4-$, $-C_3H_6-NH-CH_2-CH(CH_3)-(CO)NH-CH_2H_4-$, $-C_3H_6-NH-C_2H_4-CH_2-CH(CH_3)-(CO)NH-C_2H_4-$, $-C_{10}H_{20}-COO-CH_2-CH(CH_3)-(CO)NH-C_2H_4-$, $-C_3H_6-C_6H_4 (OCH_3)-O-CH_2-CH(CH_3)-(CO)NH-C_2H_4-$, $-C_3H_6-O-C_6H_{10}O_4-O-CH_2-CH(CH_3)-(CO)NH-C_2H_4-$, $-C_3H_6-O-CH_2-CH(CH_3)-(CO)NH-C_3H_6-$, $-C_3H_6-S-NH-C_2H_4-CH_2-CH(CH_3)-(CO)NH-C_3H_6-$, $-C_{10}H_{20}-COO-CH_2-CH(CH_3)-(CO)NH-C_3H_6-$, $-C_3H_6-C_6H_4(OCH_3)-O-CH_2-CH(CH_3)-(CO)NH-C_3H_6-$, $-C_3H_6-O-C_6H_{10}O_4-O-CH_2-CH(CH_3)-(CO)NH-C_3H_6-$, $-C_3H_6-O-CH_2-CH(CH_3)-(CO)NH-CH_2-CHOH-CH_2-$, $-C_3H_6-S-CH_2-CH(CH_3)-(CO)NH-CH_2-CHOH-CH_2-$, $-C_3H_6-NH-CH_2-CH(CH_3)-(CO)NH-CH_2-CHOH-CH_2-$, $-C_3H_6-NH-C_2H_4-CH_2-CH(CH_3)-(CO)NH-CH_2-CHOH-CH_2-$, $-C_{10}H_{20}-COO-CH_2-CH(CH_3)-(CO)NH-CH_2-CHOH-CH_2-$, $-C_3H_6-C_6H_4 (OCH_3)-O-CH_2-CH(CH_3)-(CO)NH-CH_2-CHOH-CH_2-$, $-C_3H_6-O-C_6H_{10}O_4-O-CH_2-CH(CH_3)-(CO)NH-CH_2-CHOH-CH_2-$, $-C_3H_6-O-CH_2-CH(CH_3)-COO-C_3H_6-$, $-C_3H_6-S-CH_2-CH(CH_3)-COO-C_3H_6-$, $-C_3H_6-NH-CH_2-CH(CH_3)-COO-C_3H_6-$, $-C_3H_6-NH-C_2H_4-CH_2-CH(CH_3)-COO-C_3H_6-$, $-C_{10}H_{20}-COO-CH_2-CH(CH_3)-COO-C_3H_6-$, $-C_2H_4-C_6H_4(CH_3)-O-CH_2-CH(CH_3)-COO-C_3H_6-$, $-C_3H_6-O-C_6H_{10}O_4-O-CH_2-CH(CH_3)-COO-C_3H_6-$, $-C_3H_6-O-CH_2-CH(CH_3)-COO-CH_2-CHOH-CH_2-(OC_3H_6)_{0-10}-$, $-C_3H_6-S-CH_2-CH(CH_3)-COO-CH_2-CHOH-CH_2-(OC_3H_6)_{0-10}-$, $-C_3H_6-NH-CH_2-CH(CH_3)-COO-CH_2-CHOH-CH_2-(OC_3H_6)_{0-10}-$, $-C_3H_6-NH-C_2H_4-CH_2-CH(CH_3)-COO-CH_2-CHOH-CH_2-(OC_3H_6)_{0-10}-$, $-C_{10}H_{20}-COO-CH_2-CH(CH_3)-COO-CH_2-CHOH-CH_2-(OC_3H_6)_{0-10}-$, $-C_3H_6-C_6H_4(OCH_3)-O-CH_2-CH(CH_3)-COO-CH_2-CHOH-CH_2-(OC_3H_6)_{0-10}-$, $-C_3H_6-O-C_6H_{10}O_4-O-CH_2CH(CH_3)-COO-CH_2-CHOH-CH_2-(OC_3H_6)_{0-10}-$, $-C_3H_6-O-CO-C_2H_4-NH-C_2H_4-$, $-C_3H_6-O-CO-C_2H_4-N(CH_3)-C_2H_4-$, $-C_3H_6-O-CO-C_2H_4-NH-C_3H_6-$, $-C_3H_6-O-CO-C_2H_4-NH-CH_2-CHOH-CH_2-$, $-C_3H_6-O-CO-C_2H_4-N(t-Bu)-CH_2-CHOH-CH_2-$, $-C_3H_6-O-CO-C_2H_4-N(C_6H_{11}-CH_2-CHOH-CH_2-$, $-C_3H_6-O-CO-C_2H_4-NH-CH_2-CHOH-CH_2-$, $-C_3H_6-O-CO-C_2H_4-NH-CH_2CHOH-CH_2-$, $-C_3H_6-O-CO-CH(CH_3)CH_2-NH-C_2H_4-$, $-C_3H_6-O-CO-CH(CH_3)CH_2-N(CH_3)-C_2H_4-$, $-C_3H_6-O-CO-CH(CH_3)CH_2-NH-C_3H_6-$, $-C_3H_6-O-CO-CH(CH_3)CH_2-NH-CH_2-CHOH-CH_2-$, $-C_3H_6-O-CO-CH(CH_3)CH_2-N(t-Bu)-CH_2-CHOH-CH_2-$, $-C_3H_6-O-CO-CH(CH_3)CH_2-N(C_6H_{11})-CH_2-CHOH-CH_2-$, $-C_3H_6-O-CO-CH(CH_3)CH_2-NH-CH_2-CHOH-CH_2-$, $-C_3H_6-O-CO-CH(CH_3)CH_2-NH-CH_2-CHOH-CH_2-$, $-C_3H_6-O-C_2H_4-SO_2-C_6H_4-$, $-C_3H_6-O-(C_2H_4O)_{10}-C_2H_4-SO_2-C_6H_4-$, $-C_3H_6-O-C_6H_{10}O_4-O-C_2H_4-SO_2-C_6H_4-$, $-C_3H_6-C_6H_4(OCH_3-C_2H_4-SO_2C_6H_4-$, $-C_3H_6-S-C_2H_4-SO_2-C_6H_4-$, $-C_3H_6-NH-C_2H_4-SO_2-C_6H_4-$, $-C_3H_6-NH-C_2H_4-NH-C_2H_4-SO_2-C_6H_4-$, $-C_{10}H_{20}-COO-C_2H_4-SO_2-C_6H_4-$, $-C_3H_6-O-C_2H_4-SO_2-C_3H_6-(OC_2H_{40-10}-$, $-C_3H_6-O-(C_2H_4O)_{10}-C_2H_4-SO_2-C_3H_6-(OC_2H_4)_{0-10}-$, $-C_3H_6-O-

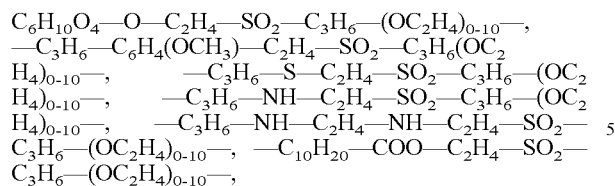

substituted or unsubstituted triazinylene radicals, for example iminopropyl-, iminoethylaminopropyl-, oxypropyl-, mercaptopropyl-, O-carboxydecyl- and glycosidoxypropyl-substituted triazinylene radicals and 6-ONa-triazinyl-2,4-ene, preference being given to iminopropyl-, iminoethylaminopropyl-, oxypropyl-, mercaptopropyl- and O-carboxydecyl-substituted triazinylene radicals.

The average molecular weight $M_w$ of the organosilicon compounds according to the present invention is preferably at least 1000 g/mol and more preferably in the range from 2000 to 50,000 g/mol.

The organosilicon compounds of the present invention are preferably liquid, waxy or solid at room temperature, i.e., at 20° C.

The viscosity of the organopolysiloxanes prepared according to the present invention is preferably in the range from 200 to 100,000 mm²/s and more preferably in the range from 500 to 20,000 mm²/s at room temperature, i.e., at 20° C.

When the cyclodextrinyl-containing organosilicon compounds of the present invention are organosiloxanes, those of the formula

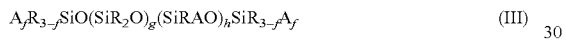

where A and R are each as defined above, f is 0 or 1, g and h are independently 0 or an integer from 1 to 500 are preferred, with the proviso that there is at least one A per molecule and the g $SiR_2O$ units and the h SiRAO units may have any desired distribution in the molecule.

Further examples in addition to the organopolysiloxanes of the formula (III) are the corresponding cyclic compounds and also mixtures of cyclics and linear compounds.

Examples of cyclodextrinyl-containing organosilicon compounds according to the present invention are Example I:

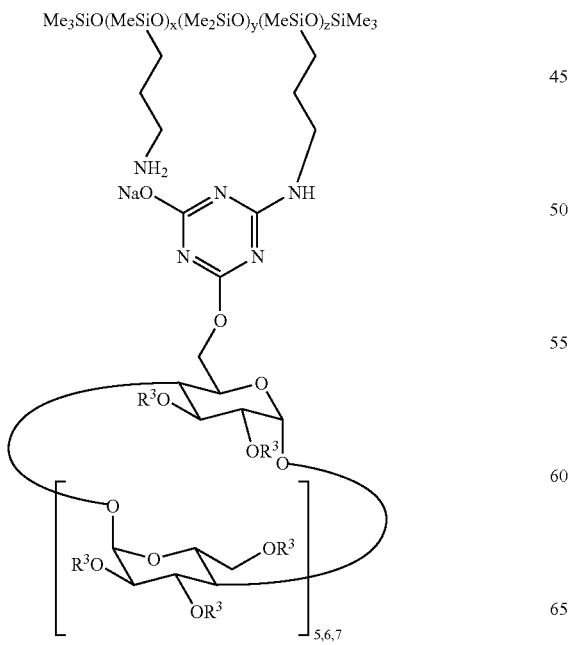

Example II:

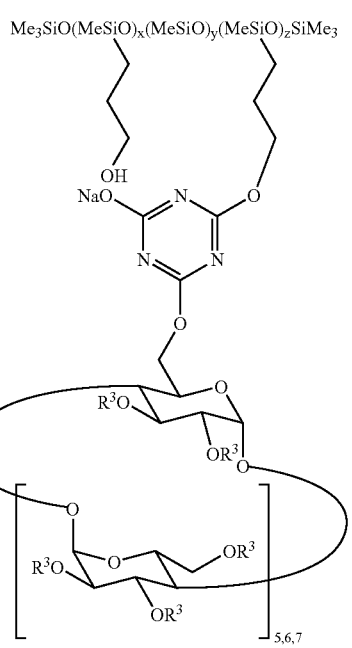

Example III:

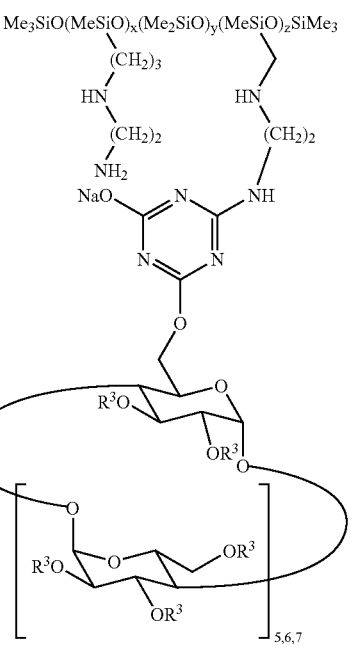

-continued
Example IV:
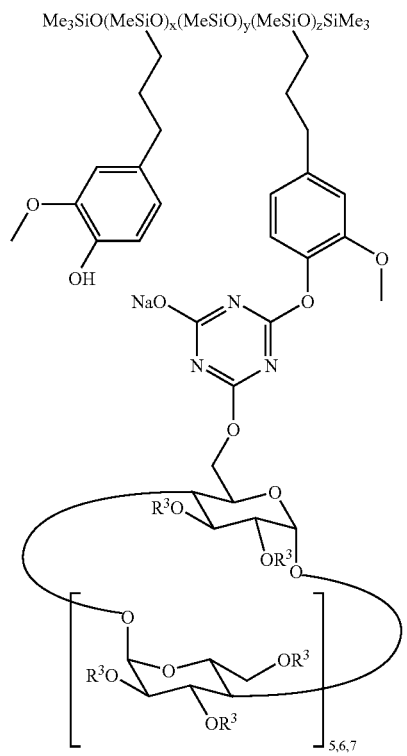
Example V:
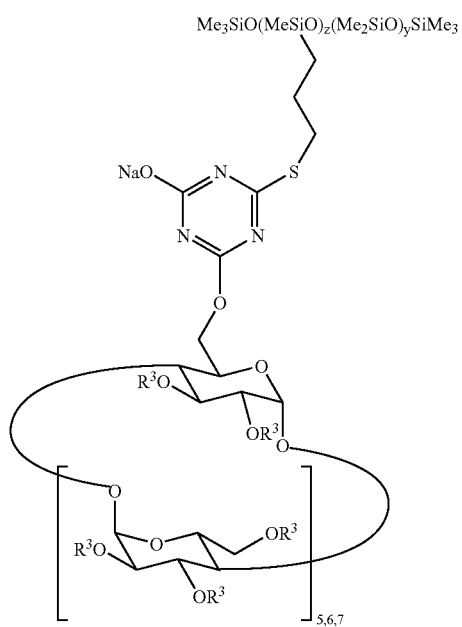
-continued
Example VI:
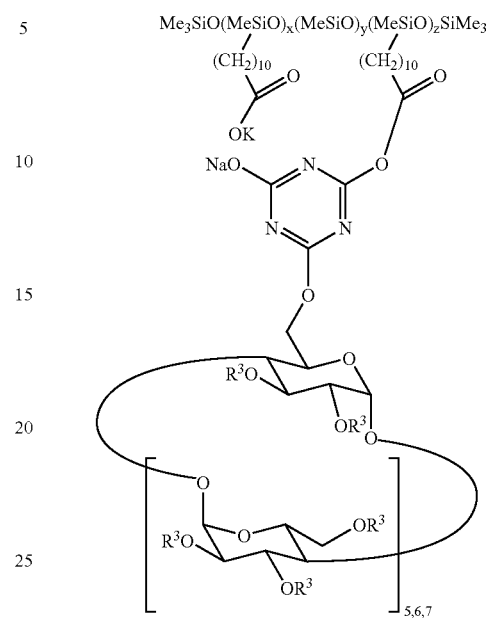
Example VII:
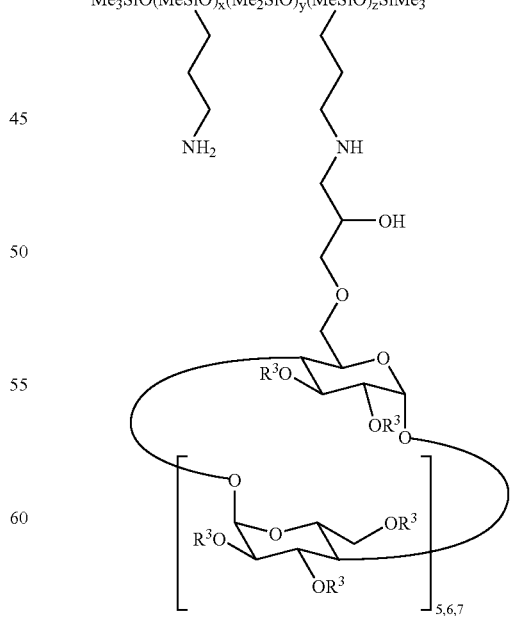

Example VIII:
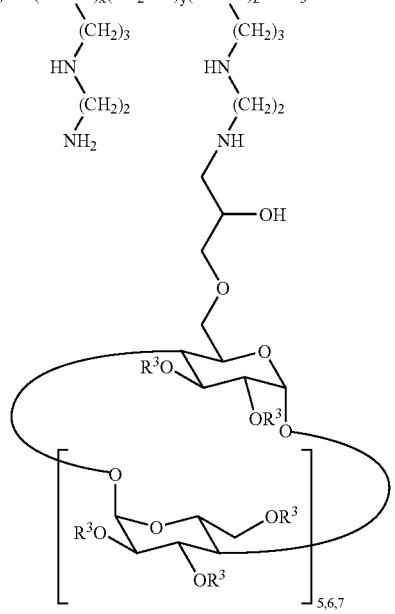
Example IX:
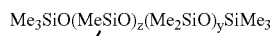
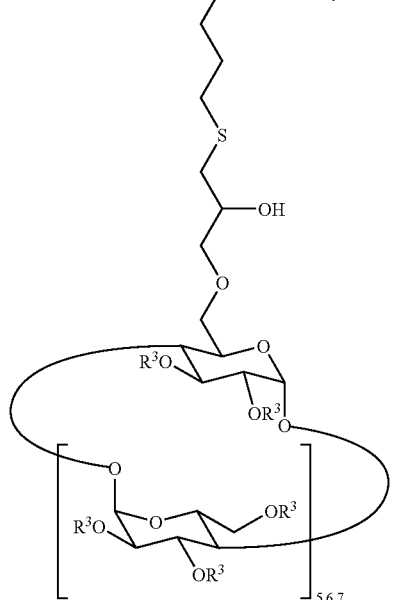
Example X:
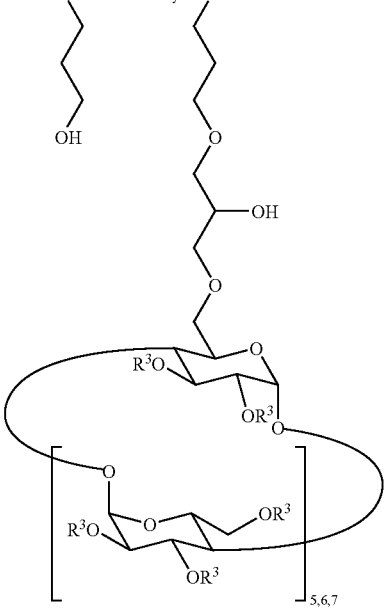
Example XI:
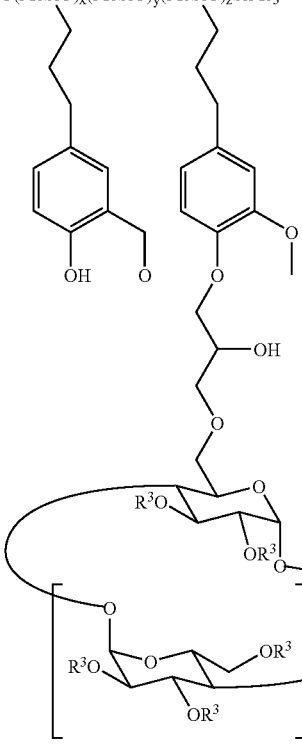

Example XII:
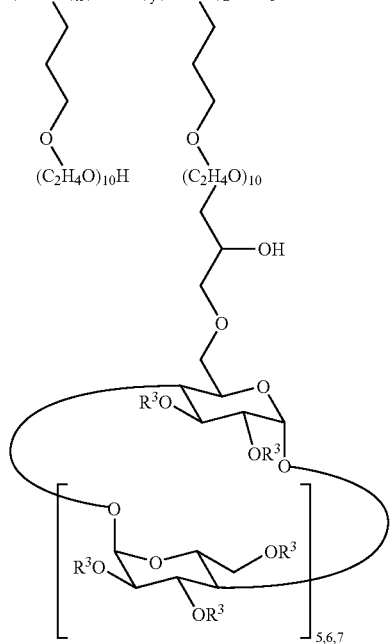
Example XIII:
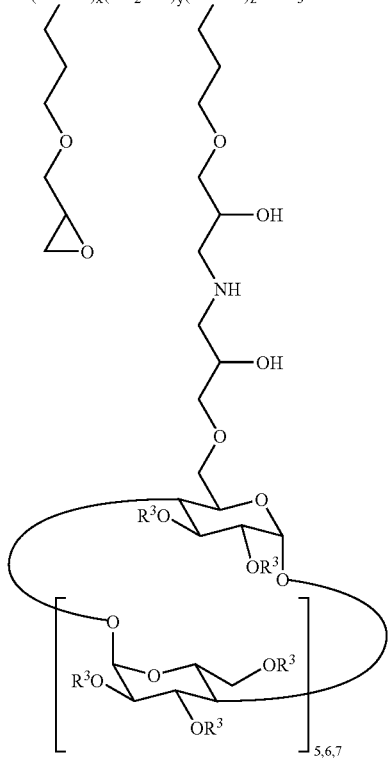
Example XIV:
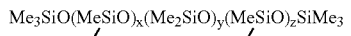
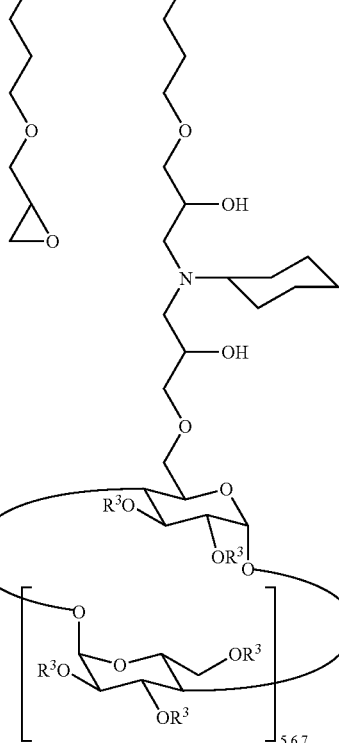
Example XV:
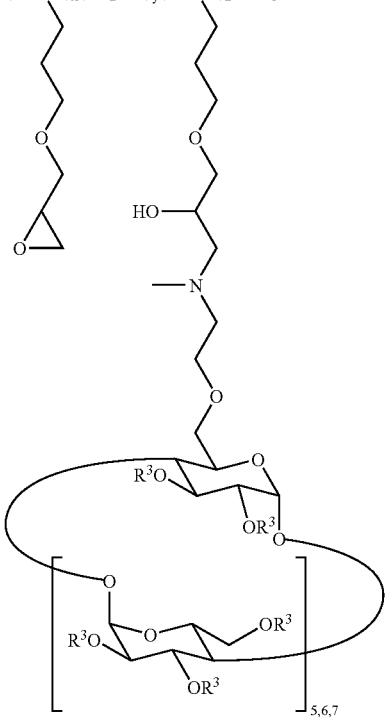

Example XVI:
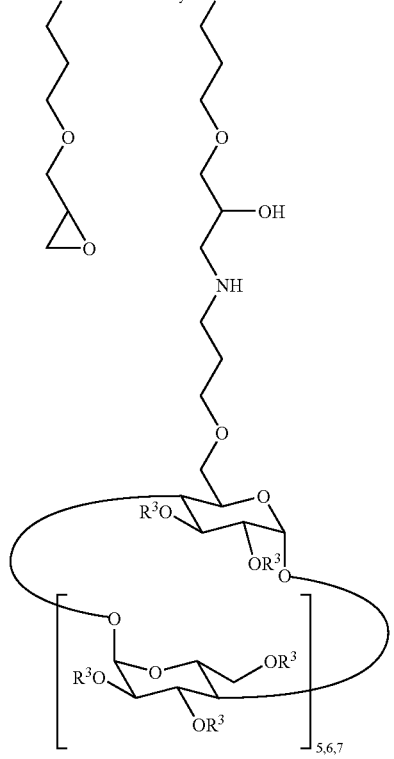
Example XVII:
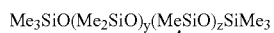
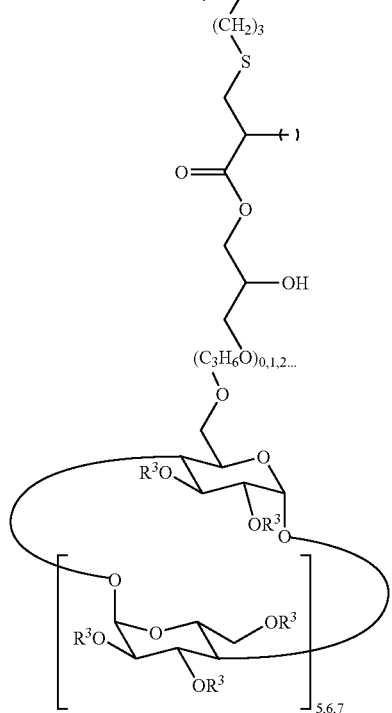
Example XVIII:
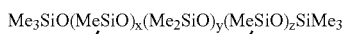
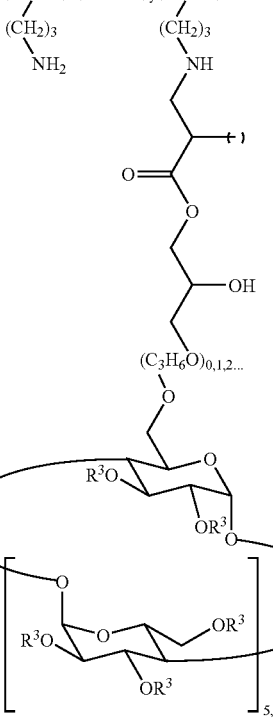
Example XIX:
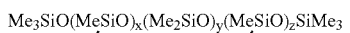
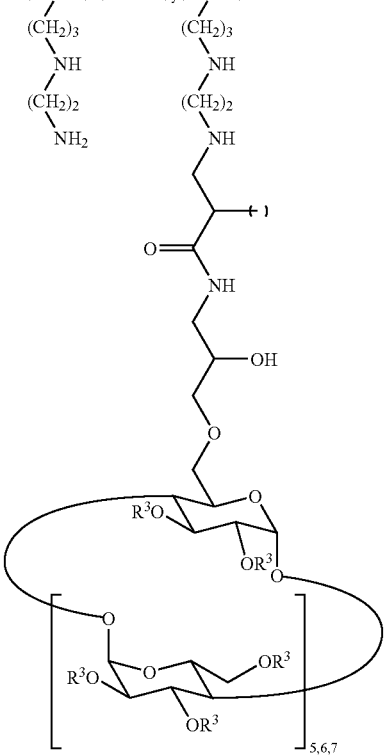

-continued
Example XX:
$Me_3SiO(MeSiO)_x(Me_2SiO)_y(MeSiO)_zSiMe_3$
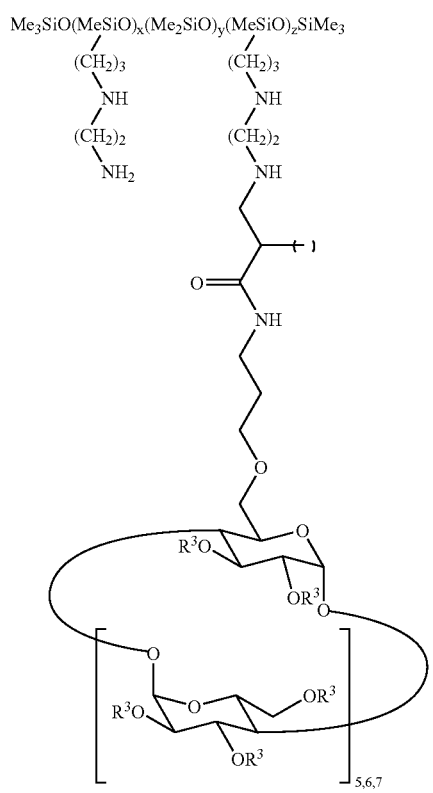
Example XXI:
$Me_3SiO(MeSiO)_x(Me_2SiO)_y(MeSiO)_zSiMe_3$
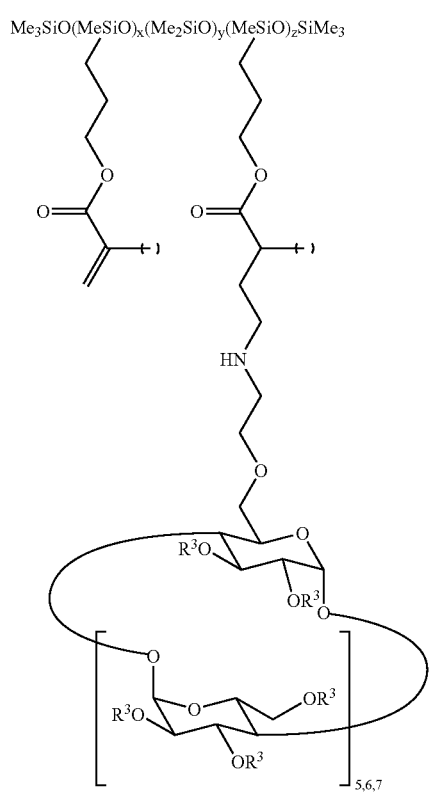
Example XXII:
$Me_3SiO(MeSiO)_x(Me_2SiO)_y(MeSiO)_zSiMe_3$
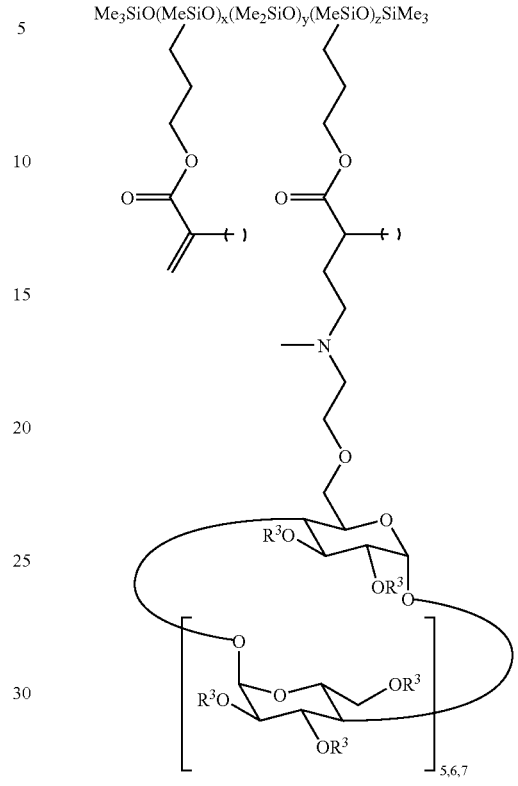
Example XXIII:
$Me_3SiO(MeSiO)_x(Me_2SiO)_y(MeSiO)_zSiMe_3$
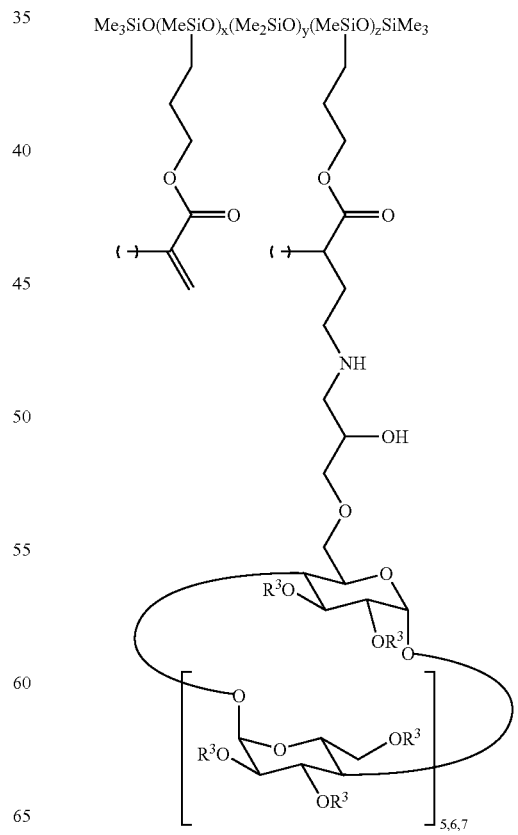

Example XXIV:
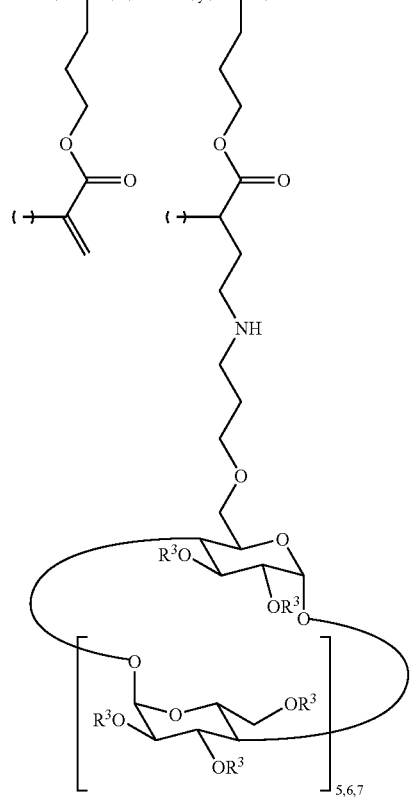
Example XXV:
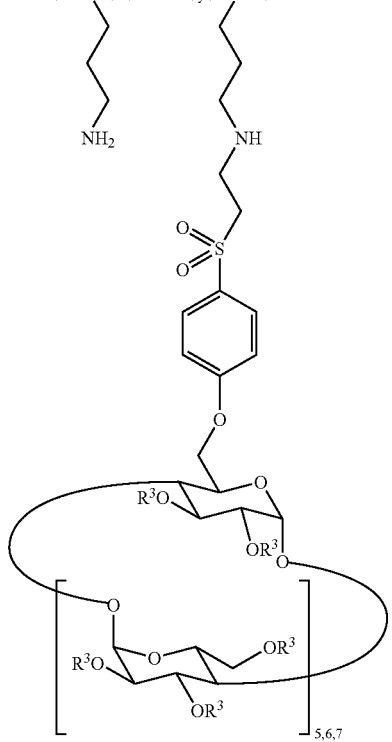
Example XXVI:
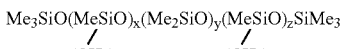
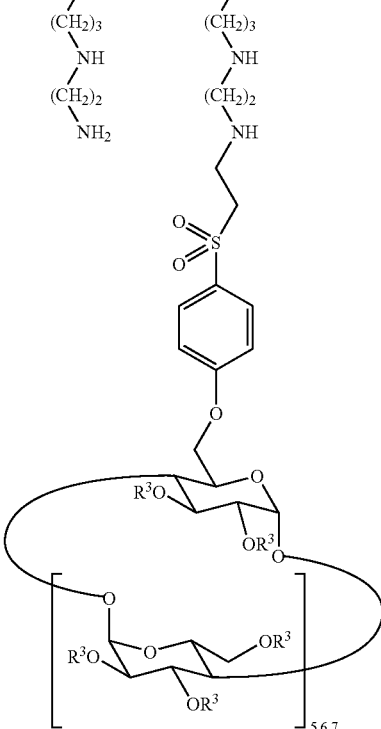
Example XXVII:
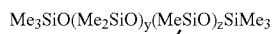
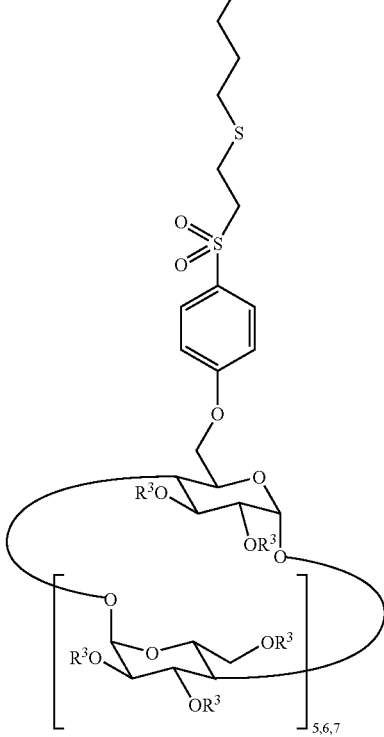

-continued
Example XXVIII:
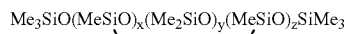
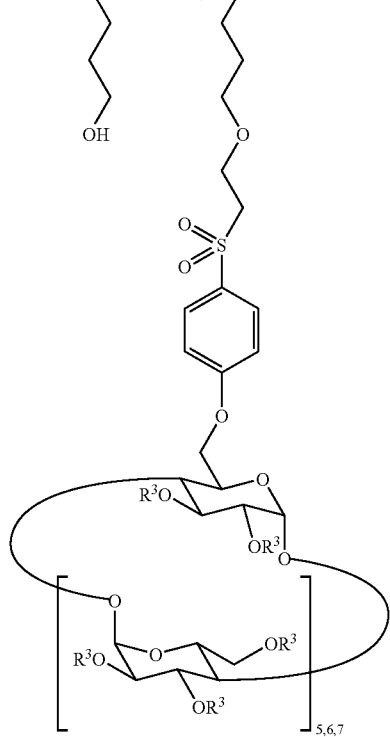
Example XXIX:
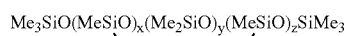
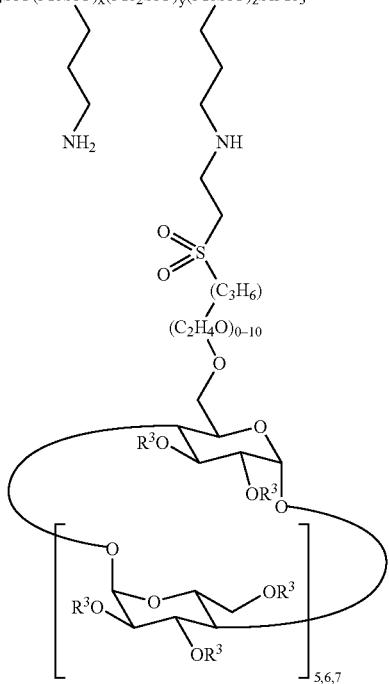
-continued
Example XXX:
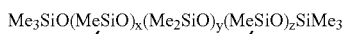
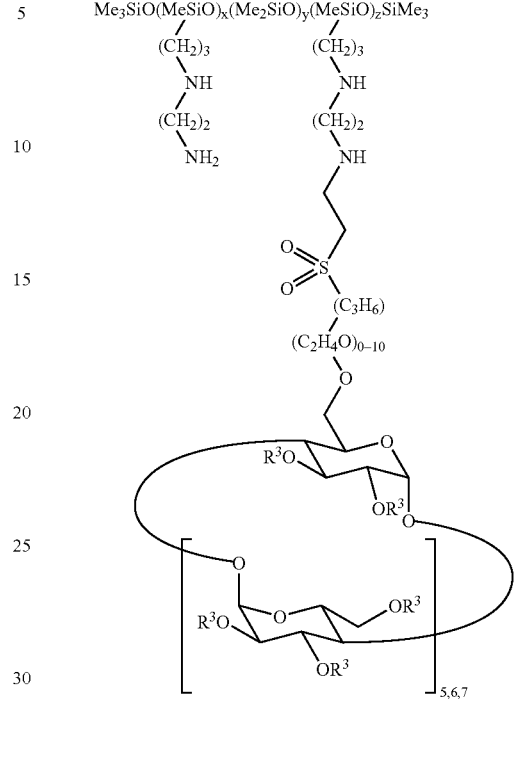
Example XXXI:
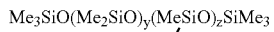
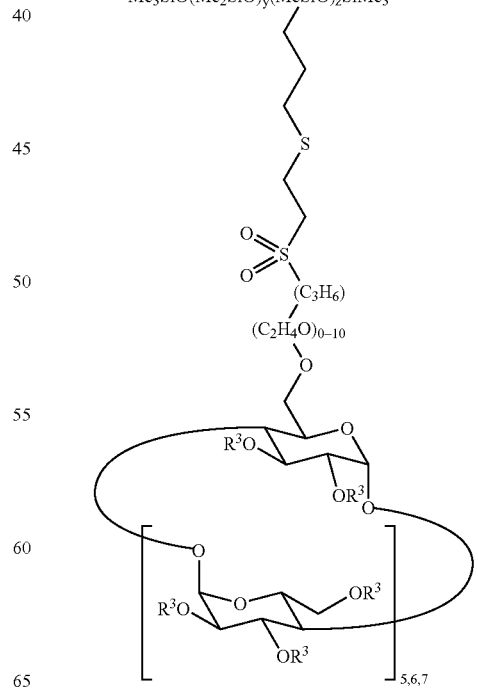

Example XXXII:

Me₃SiO(MeSiO)ₓ(Me₂SiO)ᵧ(MeSiO)_zSiMe₃

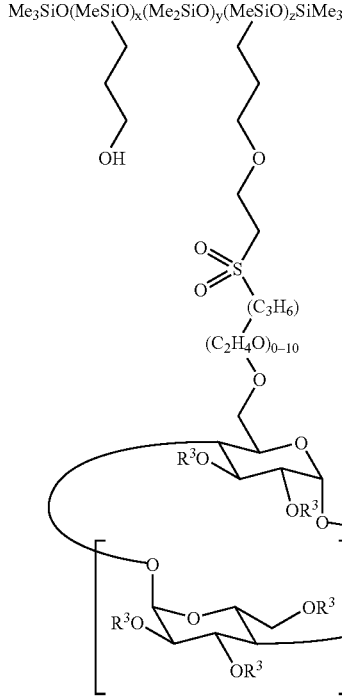

where Me is methyl, $R^3$ in each occurrence may be the same or different and has the abovementioned meaning, x is an integer between 0 and 10, y is an integer from 1 to 500 and z is an integer between 0 and 10.

The cyclodextrinyl-containing organosilicon compounds of the present invention can be prepared by any desired process, as for example by a) condensation reaction, b) nucleophilic substitution, for example of a monochlorotriazine-functional cyclodextrin (derivative) with a hydroxyl-, mercapto-, amino- or carboxyl-containing organosilicon compound, by c) epoxide ring opening reactions, as for example of amino-functional cyclodextrin (derivative) with an epoxy-functional organosilicon compound or of an epoxy-functional cyclodextrin (derivative) with a hydroxyl-, mercapto- or amino-functional organosilicon compound or d) by Michael type addition reactions, as for example of an amino-functional cyclodextrin (derivative) with a (meth)acryloyl-functional organosilicon compound or of a hydroxyl-, mercapto- or amino-functional organosilicon compound with a (meth)acrylic acid- and vinylsulfonic acid (derivative)-functional cyclodextrin (derivative).

The organosilicon compounds of the present invention can each be prepared in various ways depending on the functional groups of the reactants.

The present invention further provides a process (process 1) for preparing the organosilicon compounds of the present invention, characterized in that a halotriazine-functional cyclodextrin (derivative) is reacted with an organosilicon compound containing amino, mercapto, hydroxyl, carboxyl, anhydride, glycosido, phenol, polyglycol, phosphonato or silalactone groups.

The organosilicon compounds used according to the present invention can be any desired organosilicon compounds containing amino, mercapto, hydroxyl, carboxyl, anhydride, glycosido, phenol, polyglycol, phosphonato or silalactone groups.

The organosilicon compounds used in process 1 of the present invention preferably consist of units of the formula $$A^1{}_{a^1}R_bX_cH_dSiO_{(4-a^1-b-c-d)/2} \qquad (I^1)$$

where

R, X, b, c and d are each as defined above, $A^1$ in each occurrence may be the same or different and represents an amino, mercapto, hydroxyl, carboxyl, anhydride, glycosido, phenol, polyglycol, phosphonato or silalactone radical and $a^1$ has one of the meanings assigned to a, with the proviso that the sum $a^1+b+c+d$ is $\leq 3$ and the organosilicon compound has at least one $A^1$ radical per molecule.

The radical $A^1$ is preferably selected from mercapto- or hydroxyl-substituted hydrocarbyl radicals and their derivatives, such as mercaptopropyl and hydroxypropyl; amino-substituted hydrocarbyl radicals and their derivatives, such as aminopropyl, aminopropylaminoethyl and cyclohexylaminopropyl; and also hydrocarbyl radicals substituted by carboxylic acid groups or their derivatives, as for example by alkanoic acid radicals, such as acetyl, butyryl, undecenoyl, by acid anhydrides, such as the succinic anhydride radical, and by esters, such as the undecenesilyl ester radical, particular preference being given to amino-substituted hydrocarbyl radicals and their derivatives, such as aminopropyl, aminopropylaminoethyl and cyclohexylaminopropyl.

The preferred and particularly preferred species of the organosilicon compounds which are used according to the present invention and consist of units of the formula ($I^1$) are analogous structures corresponding to those already described above in connection with the organosilicon compounds of the present invention.

The amino-, mercapto-, hydroxyl-, carboxyl-, anhydride-, glycosido-, phenol-, polyglycol-, phosphonato- or silalactone-containing organosilicon compounds used according to the present invention are commercially available products or preparable by commonly employed silicon-chemistry processes.

The halotriazine-functional cyclodextrins or cyclodextrin derivatives used according to the present invention can be any desired, including previously known cyclodextrins or derivatives thereof which have one or more identical or different reactive halotriazine groups.

Examples of the halotriazine-functional cyclodextrins or cyclodextrin derivatives used according to the present invention are those of the general formula

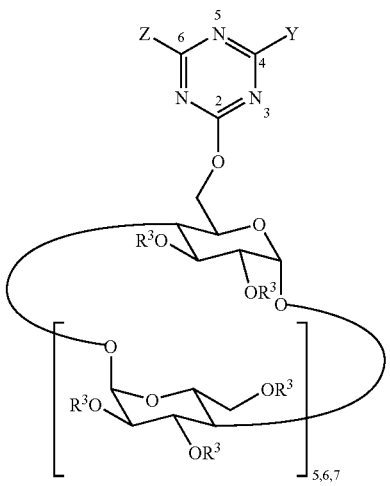

where

R³ in each occurrence may be the same or different and is as defined above,

Y and Z may be the same or different and represent a halogen atom, —OR radicals where R is as defined above, —OH or —ONa, with the proviso that at least one of Y and Z must be halogen.

The preferred halotriazine-functional cyclodextrins or cyclodextrin derivatives are those which bear fluorine or chlorine substituents and not more than one OH or ONa group in positions 4 and 6 of the halotriazine ring. Particular preference is given to (4-chloro-6-ONa-triazinyl)cyclodextrin and cyclodextrin derivatives. The halotriazine-functional cyclodextrins or cyclodextrin derivatives are commercially available products or preparable by processes commonly employed in chemistry.

Process 1 of the present invention utilizes a halotriazine-functional cyclodextrin (derivative), preferably in amounts of 0.1 to 90 percent by weight, more preferably 0.1 to 50 percent by weight, and especially 1 to 30 percent by weight, all based on the total weight of the amino-, mercapto-, hydroxyl-, carboxyl-, anhydride-, glycosido-, phenol-, polyglycol-, phosphonato- or silalactone-containing organosilicon compound, and the molar amount of cyclodextrin must not be more than 95 mol % of the above-described functional groups in the organosilicon compound.

Process 1 of the present invention can be carried out with or without catalysis, although basic catalysis is preferred.

The optional catalyst may be any known compound which increases the nucleophilicity of group $A^1$ of the organosilicon compounds by deprotonation. Examples of such catalysts are benzyltrimethylammonium hydroxide, tetramethylammonium hydroxide, alkali metal hydroxide and alkaline earth metal hydroxide, alkali metal alkoxides and alkali metal amides, with alkali metal hydroxides being preferred.

When catalysts are used in process 1 of the present invention they are preferably used in amounts of 0.001 to 1 mol, based on one mole of reactive group $A^1$ of the organosilicon compound which consists of units of the formula (I¹).

The present invention further provides a process (process 2) for preparing the organosilicon compounds according to the present invention, process 2 being characterized in that an epoxy-functional cyclodextrin or cyclodextrin derivative is reacted with an organosilicon compound containing amino, mercapto, carboxyl, anhydride, hydroxyl, glycosido, phenol, polyglycol, phosphonato or silalactone groups.

The organosilicon compounds used according to the present invention can be any desired organosilicon compounds containing amino, mercapto, carboxyl, anhydride, hydroxyl, glycosido, phenol, polyglycol, phosphonato or silalactone groups.

The organosilicon compounds used in process 2 of the present invention preferably consist of units of the formula

  (I²)

where

R, X, b, c and d are each as defined above, $A^2$ in each occurrence may be the same or different and represents an amino, mercapto, carboxyl, anhydride, hydroxyl, glycosido, phenol, polyglycol, phosphonato or silalactone radical and a² has one of the meanings assigned to a, with the proviso that the sum a²+b+c+d is ≦4 and the organosilicon compound has at least one $A^2$ radical per molecule.

The radical $A^2$ is preferably selected from mercapto- or hydroxyl-substituted hydrocarbyl radicals and their derivatives, such as mercaptopropyl and 3-hydroxy-3-methylbutyl; amino-substituted hydrocarbyl radicals and their derivatives, such as aminopropyl, aminopropylaminoethyl and cyclohexylaminopropyl; and also hydrocarbyl radicals substituted by carboxylic acid groups or their derivatives, as for example by alkanoic acid radicals, such as acetyl, butyryl, undecenoyl, by acid anhydrides, such as the succinic anhydride radical, and by esters, such as the undecenesilyl ester radical, particular preference being given to amino-substituted hydrocarbyl radicals and their derivatives, such as aminopropyl, aminopropylaminoethyl and cyclohexylaminopropyl.

The preferred and particularly preferred species of the organosilicon compounds which are used according to the present invention and consist of units of the formula (I²) are analogous to the structures already described above in connection with the organosilicon compounds of the present invention.

The amino-, mercapto-, carboxyl-, anhydride-, hydroxyl-, glycosido-, phenol-, polyglycol-, phosphonato- or silalactone-containing organosilicon compounds are commercially available products or are preparable by commonly employed silicon-chemistry processes.

The epoxy-functional cyclodextrin or derivative thereof can be any desired, including previously known cyclodextrins and cyclodextrin derivatives which have one or more identical or different epoxy-functional groups. Examples of the epoxy-functional cyclodextrins or cyclodextrin derivatives are glycidoxypropylcyclodextrin, 4,5-epoxypentylcyclodextrin, 6,7-epoxyheptylcyclodextrin and 8,10-epoxyundecylcyclodextrin, with glycidoxypropylcyclodextrin being preferred. The epoxy-functional cyclodextrins or cyclodextrin derivatives are commercially available products or are preparable by processes commonly employed in chemistry.

Process 2 of the present invention preferably utilizes an epoxy-functional cyclodextrin or its derivative in amounts of 0.1 to 90 percent by weight, more preferably 1 to 50 percent by weight and especially 1 to 30 percent by weight, all based on the total weight of the amino-, mercapto-, carboxyl-, anhydride-, hydroxyl-, glycosido-, phenol-, polyglycol-, phosphonato- or silalactone-containing organosilicon compound, and the molar amount of cyclodextrin must not be more than 95 mol % of the above-described functional groups in the organosilicon compound.

Process 2 of the present invention can be carried out with or without catalysis, although catalysis is preferred.

The optional catalyst can be any known compound that catalyzes epoxide ring opening reactions, examples being Brønsted acids, such as phosphoric acid, sulfuric acid, hydrochloric acid, glacial acetic acid and formic acid, Lewis acids, such as lithium perchlorate, zinc tetrafluoroborate, iron(II) chloride and tin(IV) chloride, Brønsted bases, examples being sodium methoxide, and alkali metal amides, and also ammonium chloride, tetraalkylammonium bromides and alkali metal iodides.

When catalysts are used in the process of the present invention they are preferably used in amounts of 0.0001 to 1 mol and especially 0.001 to 0.5 mol, each based on one mole of epoxide group of the epoxy-functional cyclodextrin or its derivative.

The present invention further provides a process (process 3) for preparing the organosilicon compounds according to the present invention, process 3 being characterized in that an amino-functional cyclodextrin (derivative) is reacted with an epoxy-functional polysiloxane.

The organosilicon compounds used according to the present invention can be any epoxy-containing organosiliconeon compound, and preferably consist of units of the formula

  (I³)

where

R, X, b, c and d are each as defined above, $A^3$ is an epoxy-functional radical and $a^3$ has one of the meanings assigned to a, with the proviso that the sum $a^3+b+c+d$ is $\leq 4$ and the organosilicon compound has at least one $A^3$ radical per molecule.

The $A^3$ radical is preferably an epoxy-functional radical having 1 to 18 carbon atoms, 3-glycidoxypropyl being particularly preferred.

The preferred and particularly preferred species of the organosilicon compounds which are used and which consist of units of the formula ($I^3$) are structures analogous to those already described above in connection with the organosilicon compounds of the present invention, and are commercially available products or are preparable according to commonly employed silicon-chemistry processes.

The amino-functional cyclodextrin or its derivative can be any desired including previously known cyclodextrins and cyclodextrin derivatives having one or more identical or different hydrocarbyl radicals substituted by amino groups and their derivatives, examples being β-aminoethyl, β-(N-methyl)aminoethyl, β-(N-ethyl)aminoethyl, γ-aminopropyl, γ-amino-2-hydroxypropyl, γ-(N-methyl)amino-2-hydroxypropyl, γ-(N-ethyl)amino-2-hydroxypropyl, γ-(N-tert-butyl)amino-2-hydroxypropyl, γ-(N-cyclohexyl)amino-2-hydroxypropyl, 3-(γ-amino-2-hydroxypropyloxy)propyl and 3-{γ-(N-ethyl)amino-2-hydroxypropyloxy}propyl.

The hydrocarbyl radical which is substituted by amino groups and derivatives thereof and which is present in the cyclodextrin (derivative) used according to the present invention is preferably β-aminoethyl, β-(N-methyl)aminoethyl, γ-aminopropyl, γ-(N-tert-butyl)amino-2-hydroxypropyl or γ-(N-cyclohexyl)amino-2-hydroxypropyl.

The amino-functional cyclodextrins or cyclodextrin derivatives used according to the present invention are commercially available products or are preparable by processes commonly employed in chemistry.

Process 3 of the present invention preferably utilizes the amino-functional cyclodextrin or derivative thereof in amounts of 0.1 to 90, more preferably 1 to 50 and especially 1 to 30 percent by weight, all based on the total weight of the epoxy-containing organosilicon compound, and the molar amount of cyclodextrin must not be more than 95 mol % of the epoxy-functional groups in the organosilicon compound.

Process 3 of the present invention can be carried out with or without catalysis, although catalysis is preferred.

The catalyst can be any known compound that catalyzes epoxide ring opening reactions, examples being Brønsted acids, such as phosphoric acid, sulfuric acid, hydrochloric acid, glacial acetic acid and formic acid, Lewis acids, such as lithium perchlorate, zinc tetrafluoroborate, iron(II) chloride and tin(IV) chloride, Brønsted bases, examples being sodium methoxide, and alkali metal amides, and also ammonium chloride, tetraalkylammonium bromides and alkali metal iodides.

When catalysts are used in process 3 of the present invention, they are preferably used in amounts of 0.0001 to 1 mol, and especially 0.001 to 0.5 mol, each based on one mole of epoxide group of the organopolysiloxane.

The present invention further provides a process (process 4) for preparing the organosilicon compounds according to the present invention, process 4 being characterized in that a vinylsulfonyl-functional cyclodextrin or a derivative thereof or a cyclodextrin or its derivative having derivatized vinylsulfonyl functionality such as 2-sulfooxyethylsulfonyl and 2-chloroethylsulfonyl groups, is reacted with an organosilicon compound containing amino, mercapto, hydroxyl, carboxyl, anhydride, glycosido, phenol, polyglycol, phosphonato or silalactone groups.

The organosilicon compounds used according to the present invention can be any desired organosilicon compounds containing amino, mercapto, hydroxyl, carboxyl, anhydride, glycosido, phenol, polyglycol, phosphonato or silalactone groups.

The organosilicon compounds used in process 4 of the present invention preferably consist of units of the formula $$A^4{}_{a^4}R_bX_cH_dSiO_{(4-a^4-b-c-d)/2} \qquad (I^4)$$

where

R, X, b, c and d are each as defined above, $A^4$ in each occurrence may be the same or different and represents an amino, mercapto, hydroxyl, carboxyl, anhydride, glycosido, phenol, polyglycol, phosphonato or silalactone radical and $a^4$ has one of the meanings assigned to a, with the proviso that the sum $a^4+b+c+d$ is $\leq 4$ and the organosilicon compound has at least one $A^4$ radical per molecule.

The radical $A^4$ is preferably selected from mercapto- or hydroxyl-substituted hydrocarbyl radicals and their derivatives, such as mercaptopropyl and hydroxypropyl; amino-substituted hydrocarbyl radicals and their derivatives, such as aminopropyl, aminopropylaminoethyl and cyclohexylaminopropyl; and also hydrocarbyl radicals substituted by carboxylic acid groups or their derivatives, as for example by alkanoic acid radicals, such as acetyl, butyryl, undecenoyl, by acid anhydrides, such as the succinic anhydride radical, and by esters, such as the undecenesilyl ester radical, particular preference being given to amino-substituted hydrocarbyl radicals and their derivatives, such as aminopropyl, aminopropylaminoethyl and cyclohexylaminopropyl.

The preferred and particularly preferred species of the organosilicon compounds which consist of units of the formula ($I^4$) are structures analogous to those already described above in connection with the organosilicon compounds of the present invention.

The vinylsulfonyl-functional or derivatized vinvisulfonvi-functional cyclodextrin or cyclodextrin derivative employed herein may be any desired, including previously known cyclodextrins or derivatives thereof having one or more identical or different reactive vinylsulfonyl groups or vinylsulfonyl group derivatives.

Examples of the vinylsulfonyl-functional or 2-sulfooxyethylsulfonyl- or 2-chloroethylsulfonyl-functional cyclodextrins or cyclodextrin derivatives are those of the general formula

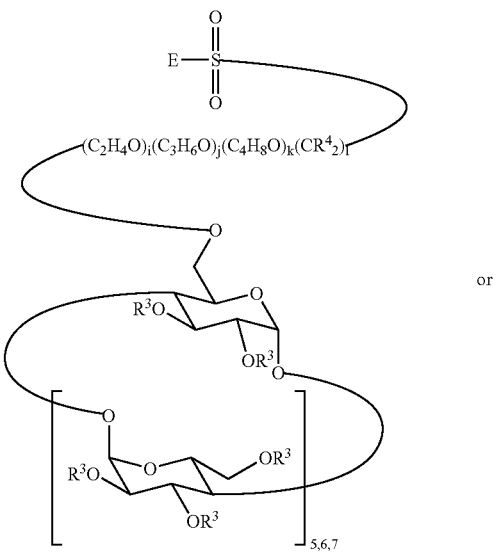

or

-continued

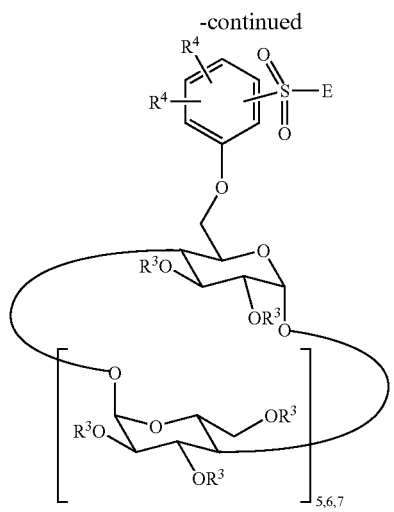

where
R³ in each occurrence may be the same or different and has one of the meanings assigned above,
R⁴ in each occurrence may be the same or different and has a hydrogen atom or one of the meanings assigned above to R,
E is —CH=CH₂, —C₂H₄—OSO₃H or —C₂H₄—Cl,
i, j and k may be the same or different and represent 0 or an integer from 1 to 100, preferably 0 or an integer from 1 to 20, and
l is 0 or an integer from 1 to 35, preferably 0 or an integer from 1 to 12.

The vinylsulfonyl-functional or 2-sulfooxyethylsulfonyl- or 2-chloroethylsulfonyl-functional cyclodextrins or cyclodextrin derivatives used according to the present invention are preferably 3-(vinylsulfonyl)propyloxycyclodextrin, vinylsulfonoylcyclodextrin, (2-sulfooxyethyl)sulfonoylcyclodextrin, (2-chloroethyl)sulfonoylcyclodextrin, p-vinylsulfonylphenoxycyclodextrin and p-(2-sulfooxyethyl)sulfonylphenoxycyclodextrin, and also polypropoxylated cyclodextrins bearing a vinylsulfonoyl, (2-sulfooxyethyl)sulfonoyl or (2-chloroethyl)sulfonoyl group in the ω position of the polyether group.

The vinylsulfonyl-functional or 2-sulfooxyethylsulfonyl- or 2-chioroethylsulfonyl-functional cyclodextrins or cyclodextrin derivatives and amino-functional cyclodextrins or cyclodextrin derivatives are commercially available products or are preparable by processes commonly employed in chemistry.

Process 4 of the present invention preferably utilizes the vinylsulfonyl-functional or 2-sulfooxyethylsulfonyl- or 2-chloroethylsulfonyl-functional cyclodextrin or cyclodextrin derivative in amounts of 0.1 to 90 percent by weight, more preferably 1 to 50 percent by weight and especially 1 to 30 percent by weight, all based on the total weight of the amino-, mercapto-, hydroxyl-, carboxyl-, anhydride-, glycosido-, phenol-, polyglycol-, phosphonato- or silalactone-containing organosilicon compound, although the molar amount of cyclodextrin must not amount to more than 95 mol % of the epoxy-functional groups in the organosilicon compound.

Process 4 of the present invention can be carried out with or without catalysis, possible catalysts including all known compounds capable of catalyzing Michael-type addition reactions.

Process 4 of the present invention is preferably carried out with catalysis, and basic catalysis is particularly preferred.

Acidic catalysis may utilize Brønsted acids, such as phosphoric acid, sulfuric acid, hydrochloric acid, glacial acetic acid, propionic acid and formic acid or their aqueous solutions and also Lewis acids, such as lithium perchlorate, zinc tetrafluoroborate, iron(II) chloride and tin(IV) chloride.

Useful basic catalysts include all known compounds that increase the nucleophilicity of the $A^4$ group of the organosilicon compounds used according to the present invention by deprotonation, examples being benzyltrimethylammonium hydroxide, tetramethylammonium hydroxide, alkali metal hydroxide and alkaline earth metal hydroxide, alkali metal alkoxides and alkali metal amides, of which alkali metal hydroxides are preferred.

When process 4 of the present invention employs catalysts, they are preferably used in amounts of 0.00 1 to 1 mol per mole of reactive $A^4$ group of the organosilicon compound.

The present invention further provides a process (process 5) for preparing the organosilicon compounds of the present invention, said process being characterized in that an acryloyl- or methacryloyl-functional cyclodextrin (derivative) is reacted with an organopolysiloxane containing amino, mercapto, hydroxyl, carboxyl, anhydride, glycosido, phenol, polyglycol, phosphonato or silalactone groups.

The organosilicon compounds used according to the present invention can be any desired organosilicon compounds containing amino, mercapto, hydroxyl, carboxyl, anhydride, glycosido, phenol, polyglycol, phosphonato or silalactone groups.

The organosilicon compounds used in process 5 of the present invention preferably consist of units of the formula $$A^5{}_{a^5}R_bX_cH_dSiO_{(4-a^5-b-c-d)/2} \qquad (I^5)$$

where

R, X, b, c and d are each as defined above, $A^5$ in each occurrence may be the same or different and represents an amino, mercapto, hydroxyl, carboxyl, anhydride, glycosido, phenol, polyglycol, phosphonato or silalactone radical and $a^5$ has one of the meanings assigned to a, with the proviso that the sum $a^5+b+c+d$ is $\leq 4$ and the organosilicon compound has at least one $A^5$ radical per molecule.

The radical $A^5$ is preferably selected from mercapto- or hydroxyl-substituted hydrocarbyl radicals and their derivatives, such as mercaptopropyl and hydroxypropyl; amino-substituted hydrocarbyl radicals and their derivatives, such as aminopropyl, aminopropylaminoethyl and cyclohexylaminopropyl; and also hydrocarbyl radicals substituted by carboxylic acid groups or their derivatives, as for example by alkanoic acid radicals, such as acetyl, butyryl, undecenoyl, by acid anhydrides, such as the succinic anhydride radical, and by esters, such as the undecenesilyl ester radical, particular preference being given to amino-substituted hydrocarbyl radicals and their derivatives, such as aminopropyl, aminopropylaminoethyl and cyclohexylaminopropyl.

The preferred and particularly preferred species of the organosilicon compounds which are used according to the present invention and consist of units of the formula ($I^5$) are structures analogous to those as already described above in connection with the organosilicon compounds of the present invention.

The amino-, mercapto-, hydroxyl-, carboxyl-, anhydride-, glycosido-, phenol-, polyglycol-, phosphonato- or silalactone-containing organosilicon compounds commercially available products or are preparable by commonly employed silicon-chemistry processes.

The acryloyl- or methacryloyl-functional cyclodextrin or derivative thereof can be any desired, including previously known cyclodextrins or derivatives thereof which have one or more identical or different reactive acryloyl or methacryloyl groups.

Examples of the acryloyl- or methacryloyl-functional cyclodextrins or cyclodextrin derivatives used according to the present invention are those of the general formulae

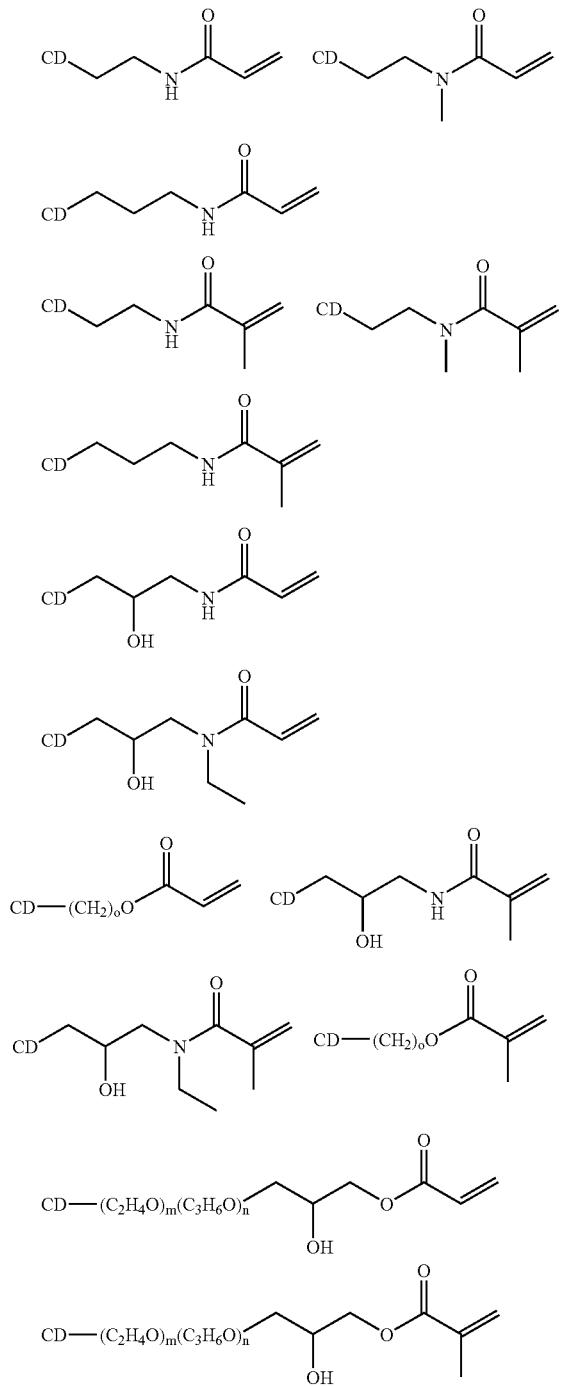

where
CD is as defined above,
m and n may be the same or different and represent an integer from 0 to 100 and preferably an integer from 0 to 10, and
o is an integer from 1 to 35 and preferably an integer from 1 to 12.

The acryloyl- or methacryloyl-functional cyclodextrin (derivative) used according to the present invention is preferably acryloylcyclodextrin, 2-(acrylamido)ethyloxycyclodextrin and 3-(acrylamido)propyloxycyclodextrin and also 2-hydroxy-3-methacryloyloxypropylcyclodextrin.

Process 5 of the present invention preferably utilizes the acryloyl- or methacryloyl-functional cyclodextrin or cyclodextrin derivative in amounts of 0.1 to 90 percent by weight, more preferably 1 to 50 percent by weight and especially 1 to 30 percent by weight, each based on the total weight of the amino-, mercapto-, hydroxyl-, carboxyl-, anhydride-, glycosido-, phenol-, polyglycol-, phosphonato- or silalactone-containing organosilicon compound, although the molar amount of cyclodextrin must not be more than 95 mol % of the epoxy-functional groups in the organosilicon compound The acryloyl- or methacryloyl-functional cyclodextrins or cyclodextrin derivatives are commercial products or are preparable by processes commonly employed in chemistry.

Process 5 of the present invention can be carried out with or without catalysis, possible catalysts including all known compounds capable of catalyzing Michael type addition reactions, examples being Brønsted acids, such as phosphoric acid, sulfuric acid, hydrochloric acid, glacial acetic acid, propionic acid and formic acid, or their aqueous solutions, Lewis acids, such as lithium perchlorate, zinc tetrafluoroborate, iron(II) chloride and tin(IV) chloride, and also Brønsted bases, such as benzyltrimethylammonium hydroxide, tetramethylammonium hydroxide, alkali metal hydroxide, alkaline earth metal hydroxide, alkali metal alkoxides and alkali metal amides.

Process 5 of the present invention is preferably carried out with catalysis, the catalyst preferably being used in amounts of 0.001 to 1 mol per mole of double bond in the acryloyl- or methacryloyl-functional cyclodextrin (derivative).

The present invention further provides a process (process 6) for preparing the organosilicon compounds of the present invention, said process being characterized in that an amino-functional cyclodextrin (derivative) is reacted with an acryloyl- or methacryloyl-containing organosilicon compound.

The organosilicon compounds used according to the present invention can be any desired acryloyl- or methacryloyl-containing organosilicon compounds.

The organosilicon compounds used in process 6 of the present invention preferably consist of units of the formula

where

R, X, b, c and d are each as defined above, $A^6$ is an acryloyl- or methacryloyl-functional radical and $a^6$ has one of the meanings assigned to a, with the proviso that the sum $a^6+b+c+d$ is $\leq 4$ and the organosilicon compound has at least one $A^6$ radical per molecule.

Examples of the $A^6$ radical are 3-acryloyloxypropyl and 3-methacryloyloxypropyl.

The preferred and particularly preferred species of the organosilicon compounds which consist of units of the formula ($I^6$) are structures analogous to those already described above in connection with the organosilicon compounds of the present invention. The acryloyl- or methacryloyl-functional organosilicon compounds are commercial products or are preparable by processes commonly employed in silicon chemistry.

The amino-functional cyclodextrin or derivative thereof can be any desired, including previously known cyclodextrins and cyclodextrin derivatives having one or more identical or different hydrocarbyl radicals substituted by amino groups and their derivatives, examples being β-aminoethyl, β-(N-methyl)aminoethyl, β-(N-ethyl)aminoethyl, γ-aminopropyl, γ-amino-2-hydroxypropyl, γ-(N-methyl)amino-2-hydroxypropyl, γ-(N-ethyl)amino-2-hydroxypropyl, γ-(N-tert-butyl)amino-2-hydroxypropyl, γ-(N-cyclohexyl)amino-2-hydroxypropyl, 3-(γ-amino-2-hydroxypropyloxy)propyl and 3-{γ-(N-ethyl)amino-2-hydroxypropyloxy}propyl.

The hydrocarbyl radical substituted by amino groups and derivatives thereof is preferably β-aminoethyl, β-(N-methyl)aminoethyl, γ-aminopropyl, γ-(N-tert-butyl)amino-2-hydroxypropyl and γ-(N-cyclohexyl)amino-2-hydroxypropyl.

Process 6 of the present invention preferably utilizes the amino-functional cyclodextrin (derivative) in amounts of 0.1 to 90 percent by weight, more preferably 1 to 50 percent by weight, and especially 1 to 30 percent by weight, all based on the total weight of the acryloyl- or methacryloyl-functional organosilicon compound, although the molar amount of cyclodextrin must not be more than 95 mel % of the epoxy-functional groups in the organosilicon compound. The amine-functional cyclodextrins or cyclodextrin derivatives are commercially available products or are preparable by processes commonly employed in chemistry.

Process 6 of the present invention can be carried out with or without catalysis, possible catalysts including all known compounds capable of catalyzing Michael type addition reactions, examples being Brønsted acids, such as phosphoric acid, sulfuric acid, hydrochloric acid, glacial acetic acid, propionic acid and formic acid, or their aqueous solutions, Lewis acids, such as lithium perchlorate, zinc tetrafluoroborate, iron(II) chloride and tin(IV) chloride, and also Brønsted bases, such as benzyltrimethylammonium hydroxide, tetramethylammonium hydroxide, alkali metal hydroxide, alkaline earth metal hydroxide, alkali metal alkoxides and alkali metal amides.

Process 6 of the present invention is preferably carried out with catalysis, the catalyst being used in amounts of 0.001 to 1 mol per mole of acryloyl or methacryloyl group of the organosilicon compound used according to the present invention.

One advantage of all the present invention's processes described is, independently, that they are simple to carry out while being highly flexible and are applicable not only to silanes, i.e., compounds of the formula (I) where a+b+c+d=4, but also polysiloxanes, i.e., compounds comprising units of the formula (I) where a+b+c+d≦3.

A further advantage of the processes of the present invention is that the properties of the organosilicon compounds, such as stability, hydrophilicity, hydrophobicity, self-emulsifiability, etc., can each be set to targeted values in a simple and very controlled manner, through modification of the cyclodextrin content and also of the polymeric structures and chain lengths, or the precise silane structure.

Processes 1 to 6 of the present invention can each be carried out batchwise, semicontinuously or continuously independently of each of the others.

The reactions in the present invention's processes 1 to 6 are each preferably carried out as a 1-phase or 2-phase reaction. There now follows a description of three possible variants which are of equal applicability to all processes of the present invention:
- as a 2-phase reaction with mechanical input of the required reaction energy by concurrent homogenization of the reaction mixture using a high-shearing apparatus (variant A),
- as a 2-phase reaction by reaction of dispersions (variant B), or
- as a 1-phase reaction by using an aprotic solvent which is inert toward the reactants (variant C).

2-Phase Reaction with Mechanical Input of Energy (Variant A)

In variant A, the present invention's reaction of cyclodextrin or a cyclodextrin derivative with an organosilicon compound utilizes nonmiscible solvents for either or both of the reactants, so that 2 phases are formed, by means of suitable mixing methods, with or without catalyst.

Useful solvents for the cyclodextrin (derivative) are those which are inert toward the reactive groups of the cyclodextrin (derivative), such as organic aprotic solvents, water, aqueous solutions of electrolyte, aqueous alkalis, aqueous acids or organically aqueous mixtures of the abovementioned aprotic organic solvents with aqueous systems. Preferred organic aprotic solvents are dimethylformamide and dimethyl sulfoxide. Preferred aqueous systems are aqueous acids and aqueous alkalis.

The solvent in which the cyclodextrin (derivative) is dissolved is preferably an aqueous system and more preferably an aqueous solution of 1 to 50% by weight.

Useful solvents for the organosilicon compound are those which are inert toward the reactive groups of the reactants, such as organic aprotic solvents, examples being toluene, hexane, cyclohexane, or dimeric, oligomeric or polymeric siloxanes, examples being hexamethyldisiloxane or octamethylcyclotetrasiloxane, which are nonmiscible with the solvent or solvent mixture of the cyclodextrin (derivative) As used herein, nonmiscibility of solvents refers to a miscibility of up to a maximum of 1% by weight at 25° C. and the pressure of the ambient atmosphere.

The present invention's reaction as per variant A is preferably carried out at a temperature of 0 to 200° C., more preferably 50 to 150° C. and especially 70 to 130° C., and preferably at the pressure of the ambient atmosphere, i.e., at 900 to 1100 hPa. The reaction times are preferably between 5 minutes and 2 hours and more preferably between 5 and 45 minutes.

The present invention's reaction according to variant A can utilize all known methods capable of substantially homogenizing the two nonmiscible phases and thus creating a large internal area where reaction can take place, including continuous mixing processes. Useful methods for dispersing the phases include stirrers of all kinds, preferably ultrasonic probes or baths or high-speed stirrers, particular preference being given to high-speed stirrers, for example Ultra-Turrax (Janke & Kunnel, IKA Labortechnik Ultra-Turrax T 50, 1100 W, 10,000 rpm) or acentric dissolver systems (Molteni, Labmax, 6000 rpm).

The present invention's processes according to variant A have the advantage that the cyclodextrinyl-containing organosilicon compounds obtained according to the present invention do not have to be worked up. It is a further advantage of the processes according to variant A that they can be carried out without solubilizers, such as primary alcohol, and without surface-active substances, such as surfactants.

2-Phase Reaction by Reaction of Dispersions (Variant B)

The present invention's conversion of the starting compounds to the present invention's organosilicon compounds can also be carried out in dispersion, such as micro- or macroemulsion, for example, the organosilicon compound being the disperse phase in the aqueous liquor and being stabilized in a conventional manner, for example by suitable emulsifiers.

The cyclodextrin (derivative) is dissolved in a suitable solvent, preferably in water or dilute aqueous solution of electrolyte, and added to the dispersion, or vice versa. The reaction according to variant B is selectively carried out with or without catalyst, again depending on the process.

The present invention's reaction as per variant B is carried out at a temperature of preferably 0 to 100° C., more preferably 10 to 50° C. and especially 20 to 35° C. and preferably at a pressure of the ambient atmosphere, i.e., at 900 to 1100 hPa. The reaction times are preferably between one and 200 hours, during which the dispersion is advantageously agitated.

The dispersion which comprises the organosilicon compound can be produced in any desired or previously known manner. All emulsifiers previously used for producing dispersions can be used, such emulsifiers being nonionic, anionic, cationic or amphoteric, for example. The dispersions used according to the present invention preferably have an organosilicon fraction of 1 to 50 percent by weight.

The present invention's processes according to variant B have the advantage that the cyclodextrinyl-containing organosilicon compounds obtained according to the present invention will be directly in the form of emulsions after the reaction has ended and can be applied directly for the intended purpose in the form of these as-synthesized emulsions.

If, however, it is desired to work up the as-synthesized dispersion comprising the organosilicon compounds of the present invention, workup can be effected according to conventional methods, as for example by breaking the dispersion with concentrated solutions of electrolyte or by adding water-soluble, polar solvents, such as acetone. Preferably, the oil phase is then separated off and subsequently purified by repeated extraction with concentrated solutions of electrolyte, as with 20% by weight sodium chloride solution for example. The thus obtained organosilicon compounds of the present invention are then preferably dried.

1-Phase Reaction (Variant C)

The present invention's conversions of starting compounds into the present invention's organosilicon compounds can also be conducted homogeneously. In a homogeneous regime, the cyclodextrin (derivative) used according to the present invention is dissolved in a conjoint aprotic organic solvent which is inert toward the reactants, or aqueous organic solvent mixtures, preferably in dimethylformamide, dimethyl sulfoxide or hexamethylphosphoramide or more preferably in dimethyl sulfoxide. The conversion according to variant C is likewise selectively carried out with or without catalyst depending on the process.

The present invention's reaction as per variant C is preferably carried out at a temperature of 0 to 100° C., more preferably 60 to 80° C., and preferably at the pressure of the ambient atmosphere, i.e., at 900 to 1100 hPa. The reaction times are preferably between 15 minutes and 5 hours.

The organosilicon compounds of the present invention may then be isolated, for example by simply distilling off the solvent or solvent mixture.

The present invention's reaction as per variant C has the advantage that it is simple to carry out using simple apparatus and gives the organosilicon compounds of the present invention in pure form.

All the processes of the present invention which are carried out according to variants A, B or C have the advantage that they are very simple to carry out and that the organosilicon compounds of the present invention can be prepared reproducibly and in a very high yield, preferably 90 to 99%.

The organosilicon compounds of the present invention are preferably carried out according to variant A or B, each, if appropriate, combined with an equilibration step.

If desired, the cyclodextrinyl-containing organosilicon compounds obtained by the processes of the present invention can be equilibrated with organopolysiloxanes preferably selected from the group consisting of linear triorganosiloxy-terminated organopolysiloxanes, linear hydroxyl-terminated organopolysiloxanes, cyclic organopolysiloxanes and interpolymers consisting of diorganosiloxane and monoorganosiloxane units, whereby establishing a desired molecular weight controlled distribution of cyclodextrin groups in the molecule, and, if appropriate the introduction of further functionalities, is made possible.

It is preferable to use linear triorganosiloxy-terminated organopolysiloxanes of the formula

linear hydroxyl-terminated organopolysiloxanes of the formula

cyclic organopolysiloxanes of the formula

and interpolymers consisting of units of the formula

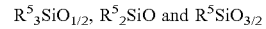

where
$R^5$ in each occurrence may be the same or different and has one of the meanings assigned to R,
p is 0 or an integer from 1 to 1500,
q is 0 or an integer from 1 to 1500, and
r is an integer from 3 to 12.

The optional equilibration utilizes the organopolysiloxanes and the organosilicon compounds prepared according to the present invention in mixing ratios which are really dictated by the fraction of cyclodextrin groups which is desired in the organosilicon compound generated in the course of the optional equilibration and by the desired average chain length.

The optional equilibration preferably utilizes basic catalysts which speed equilibration. Examples of such catalysts are benzyltrimethylammonium hydroxide, tetramethylammonium hydroxide, alkali metal hydroxide and alkaline earth metal hydroxide in methanol solution, for example a methanol solution having an NaOH or KOH content between 5% and 20% by weight), and also silanolates. Preference here is given to alkali metal hydroxides, which are preferably used in amounts of 50 to 10,000 ppm (parts per million), especially 500 to 2000 ppm, all based on the total weight of the organosilicon compounds used. The catalyst can be rendered ineffective before the mixture obtained in the course of the equilibration is worked up.

The optional equilibration is preferably carried out at a temperature of 50 to 150° C., more preferably 70 to 120° C., and preferably at the pressure of the ambient atmosphere, i.e., at 900 to 1100 hPa, however the equilibration can also be carried out at higher or lower pressure.

The equilibration may, if desired, be carried out in water-immiscible solvent such as toluene, but this is not preferable. However, if such organic solvents are used, amounts from 5% to 20% by weight, based on the total weight of the organosilicon compounds used, are preferred.

The organosilicon compounds of the present invention or prepared according to the present invention have the further advantage that they are stable in storage at room temperature and under ambient pressure for at least 1 year.

It is a further advantage of the present invention that the organosilicon compounds of the present invention or those prepared according to the present invention can be used neat, in solution or in the form of emulsions and dispersions.

The organosilicon compounds can be used for many purposes for which the previously known cyclodextrins, cyclodextrin derivatives and organosilicon compounds have likewise been used. The advantage is that the organosilicon compounds the present invention combine the properties of cyclodextrins with those of organosilicon compounds, such as silicones. The organosilicon compounds according to the invention can therefore be used wherever there is a simultaneous requirement for the properties of silicones, for example hydrophobidization, soil repellency, protection, softness, etc., combined with those of cyclodextrins, for example hydrophilicity, guest-host effects, etc.

The organosilicon compounds of the present invention can be used as a carrier for active components, as an absorbent of odors or odorants, as a textile auxiliary, as a compatibilizer, as an antifoam agent, as an ingredient in cosmetics or shampoos, in paint care, for example for automotive paintwork, to modify hard surfaces and as a constituent or additive in self-curing filling and sealing materials.

The organosilicon compounds of the present invention and the organosilicon compounds prepared according to the present invention are particularly useful for finishing organic fibers, preferably textile materials, and leather.

The present invention further provides a process for treating organic fibers, which process is characterized in that organosilicon compounds of the present invention are applied to the fibers or fabrics to be treated.

This can be accomplished by spraying, for example, but is preferably done by pad-mangle application from aqueous systems. To this end, an emulsion of the cyclodextrinyl-containing organosilicon compound of the present invention is applied to a textile fabric such as wovens, formed-loop knits or nonwovens, or to a fiber tow. Spraying can be performed using a spray head, a spray beam or a plate sprayer, for example a Weko machine, which is well-known in the textile industry.

In pad-mangle application, the textile substrate is led through a dip bath and subsequently squeezed off by a pair of rolls to a defined wet pickup. The loading of the textile substrate with the cyclodextrinyl-containing organosilicon compound of the present invention can be controlled through the concentration of the treatment liquor and through the wet pickup.

When the introduction of cyclodextrinyl-containing organosilicon compounds to the textile is intended to achieve permanent application of fragrance chemicals, the loading of the cyclodextrin with the fragrance chemical can (as illustrated in the operative examples which follow) be carried out in the course of the process for preparing the cyclodextrinyl-containing organosilicon compounds. The cellulosic substrate materials finished according to the present invention advantageously have a pleasant textile hand and are capable of storing perfumes and fragrance chemicals for a prolonged period and of releasing these in a gradual and controlled fashion only after the action of body heat and moisture. When unloaded cyclodextrins are applied and/or after the fragrance chemicals have been released, thus finished materials are capable of absorbing odors and thus of producing a freshness effect. Instead of fragrance chemicals it is of course also possible to incorporate other active-component chemicals, such as insecticidal, herbicidal, medically or biologically active agents for example, as guest molecules in the cyclodextrins in a known manner.

The present invention's process for treating organic fibers has the advantage that the organic fibers treated by the organosilicon compounds of the present invention have a pleasant softness, and have the further advantage that they can be applied directly in an aqueous medium, for example from an emulsion.

The present invention's process for treating organic fibers has the advantage that the cyclodextrinyl-containing organosilicon compounds can be carried out by process variant B of the present invention directly from the reactants, which react with each other in situ, in the course of the texeile-finishing opeartion.

The present invention further provides crosslinkable compositions based on organosilicon compounds comprising (A) organopolysiloxanes having two or more hydrolyzable or condensation-capable moieties selected from organyloxy groups and hydroxyl radicals, (B) a cyclodextrinyl-containing organosilicon compound having two or more hydrolyzable or condensation-capable moieties selected from organyloxy groups and hydroxyl radicals, and/or their partial hydrolyzates or their partial condensates, if appropriate (C) a crosslinker selected from organopolysiloxanes having two or more Si-attached hydrogen atoms and amino-containing organosilicon compounds having two or more hydrolyzable or condensation-capable moieties selected from organyloxy groups and hydroxyl radicals and if appropriate (D) a condensation catalyst.

Component (A) used in the compositions of the present invention can be any desired organopolysiloxanes which have previously been used in compositions crosslinkable by condensation reaction.

The organopolysiloxanes (A) used according to the present invention preferably have the general formula

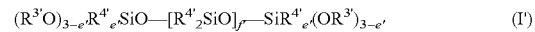 (I')

where e' is 0, 1 or 2, $R^{4'}$ denotes identical or different SiC-attached hydrocarbyl radicals with or without substitution by halogen atoms, amino groups, ether groups, ester groups, epoxy groups, cyano groups or (poly)glycol radicals, the latter being constructed from oxyethylene and/or oxypropylene units, and $R^{3'}$ may in each occurrence be the same or different and represent a hydrogen atom or have one of the meanings indicated for $R^{4'}$, f' is an integer from 10 to 100 000, preferably from 20 to 20 000 and more preferably from 30 to 2000, with the proviso that e' can only be 2 when $R^{3'}$ is a hydrogen atom.

Examples of $R^{4'}$ radicals are alkyl radicals, such as methyl, ethyl, n-propyl, isopropyl, 1-n-butyl, 2-n-butyl, isobutyl, tert-butyl, n-pentyl, isopentyl, neopentyl, tert-pentyl; hexyl radicals, such as n-hexyl; heptyl radicals, such as n-heptyl; octyl radicals, such as n-octyl and isooctyl, such as the 2,2,4-trimethylpentyl radical; nonyl radicals, such as n-nonyl; decyl radicals, such as n-decyl; dodecyl radicals, such as n-dodecyl; octadecyl radicals, such as n-octadecyl; cycloalkyl radicals, such as cyclopentyl, cyclohexyl, cycloheptyl and methylcyclohexyl; alkenyl radicals, such as vinyl, 1-propenyl and 2-propenyl; aryl radicals, such as phenyl, naphthyl, anthryl and phenanthryl; alkaryl radicals, such as o-, m-, p-tolyl; xylyl radicals and ethylphenyl radicals; and aralkyl radicals, such as benzyl, α-phenylethyl and β-phenylethyl.

Examples of substituted $R^{4'}$ radicals are haloalkyl radicals, such as 3,3,3-trifluoro-n-propyl, 2,2,2,2',2',2'-hexafluoroisopropyl, heptafluoroisopropyl and haloaryl radicals, such as o-, m- and p-chlorophenyl, aminopropyl, aminoethylaminopropyl, cyclohexylaminopropyl, N-alkylaminopropyl and N,N-di-alkylaminopropyl.

The radical $R^4$ is preferably unsubstituted or amino-substituted hydrocarbyl radicals having 1 to 18 carbon atoms, more preferably unsubstituted hydrocarbyl radicals having 1 to 4 carbon atoms and especially methyl or ethyl.

Examples of $R^{3'}$ radicals are the examples assigned to the radical $R^{4'}$.

$R^{3'}$ is preferably a hydrogen atom or an alkyl radical having 1 to 8 carbon atoms, and more preferably hydrogen, methyl or ethyl.

The average value of f' in the formula (I') is preferably such that the organopolysiloxane of the formula (I') has a viscosity of 100 to 100,000 mm²/s and more preferably of 2000 to 50,000 mm²/s, each measured at a temperature of 25° C.

Although not indicated in the formula (I'), up to 10 mol percent of the diorganosiloxane units can be replaced by other siloxane units, such as $R^{4'}_3SiO_{1/2}$, $R^{4'}SiO_{3/2}$ and $SiO_{4/2}$ units, $R^{4'}$ having the meaning assigned to it above.

Examples of the diorganopolysiloxanes used in the present invention's compositions that have at least two organyloxy radicals or hydroxyl radicals on each end group (A) are

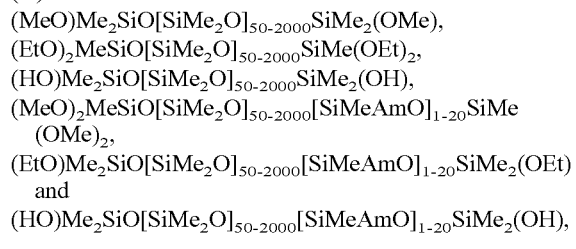

where Me is methyl and Am is aminopropyl, aminoethylaminopropyl or cyclohexylamino.

The organopolysiloxanes (A) used in the compositions of the present invention are commercially available products or can be prepared by processes known in silicon chemistry, for example by reaction of α,ω-dihydroxypolyorganosiloxanes with the appropriate organyloxysilanes.

Component (A) is preferably used in the form of an aqueous emulsion. The aqueous emulsion in question can be a customary emulsion which can be produced in a conventional manner with the assistance of suitable emulsifiers. Examples of suitable emulsifiers are alkylphenol ethoxylates or fatty alcohol ethoxylates. When component (A) is used in the form of an emulsion, the solids content of the emulsion can be almost freely choosable, and typically the solids content of such emulsions is between 15 and 55 percent by weight.

Component (A) can also be prepared directly in emulsion by emulsion polymerization of oligomeric precursors, for example by alkylbenzenesulfonic acid catalysis.

The organosilicon compounds (B) used in the compositions of the present invention preferably comprise units of the formula

where

A' may in each occurrence be the same or different and represent a radical of the formula

where

CD' represents a monovalent, derivatized or underivatized cyclodextrin radical and $R^{2'}$ represents a divalent, substituted or unsubstituted hydrocarbyl radical which may be interrupted by oxygen or by mercapto, amine, carbonyl, carboxyl, sulfoxide or sulfonyl groups, R' may in each occurrence be the same or different and represents a substituted or unsubstituted hydrocarbyl radical which may be interrupted by oxygen atoms and/or nitrogen atoms, X' may in each occurrence be the same or different and is a radical of the formula $-OR^{1'}$ where $R^{1'}$ is a hydrogen atom or substituted or unsubstituted hydrocarbyl with or without substitution by ether oxygen atoms, a' is 0, 1 or 2, preferably 0 or 1, b' is 0, 1, 2 or 3, and c' is 0, 1, 2 or 3, with the proviso that the sum a'+b'+c' is ≦4, the organosilicon compound has at least one A' radical and at least two X' radicals per molecule.

The organosilicon compounds (B) can be not only silanes, i.e., compounds of the formula (II') where a'+b'+c'=4, but also siloxanes, i.e., compounds comprising units of the formula (II') where a'+b'+c'≦3. The organosilicon compounds used according to the present invention are preferably silanes. When component (B) is a siloxane, it will be especially a siloxane which consists of units of the formula (II').

Examples of R' radicals are alkyl radicals, such as methyl, ethyl, n-propyl, isopropyl, 1-n-butyl, 2-n-butyl, isobutyl, tert-butyl, n-pentyl, isopentyl, neopentyl, tert-pentyl; hexyl radicals, such as n-hexyl; heptyl radicals, such as n-heptyl; octyl radicals, such as n-octyl and isooctyl, such as the 2,2,4-trimethylpentyl radical; nonyl radicals, such as n-nonyl; decyl radicals, such as n-decyl; dodecyl radicals, such as n-dodecyl; octadecyl radicals, such as n-octadecyl; cycloalkyl radicals, such as cyclopentyl, cyclohexyl, cycloheptyl and methylcyclohexyl; alkenyl radicals, such as vinyl, 1-propenyl and 2-propenyl; aryl radicals, such as phenyl, naphthyl, anthryl and phenanthryl; alkaryl radicals, such as o-, m-, p-tolyl; xylyl radicals and ethylphenyl radicals; and aralkyl radicals, such as benzyl, α-phenylethyl and β-phenylethyl.

Examples of substituted R' radicals are haloalkyl radicals, such as 3,3,3-trifluoro-n-propyl, 2,2,2,2',2',2'-hexafluoroisopropyl, heptafluoroisopropyl and haloaryl radicals, such as o-, m- and p-chlorophenyl, aminopropyl, aminoethylaminopropyl, cyclohexylaminopropyl, dimethylaminopropyl and diethylaminopropyl.

R' is preferably unsubstituted or amine-substituted hydrocarbyl having 1 or 18 carbon atoms, more preferably unsubstituted or amine-substituted hydrocarbyl having 1 to 6 carbon atoms and especially methyl, aminopropyl and aminoethylaminopropyl.

When component (B) is a siloxane, preferably at least 50% and more preferably at least 90% of all R' radicals are methyl radicals.

Examples of $R^{1'}$ radicals are the examples indicated for R'.

$R^{1'}$ is preferably a hydrogen atom or an alkyl radical having 1 to 8 carbon atoms and more preferably a hydrogen atom, methyl or ethyl.

X' is preferably hydroxyl, methoxy or ethoxy.

The CD' radicals can be any desired and previously known cyclodextrins and cyclodextrin derivatives where an oxygen-attached hydrogen atom is replaced by a chemical bond. The CD radicals preferably have the general formula

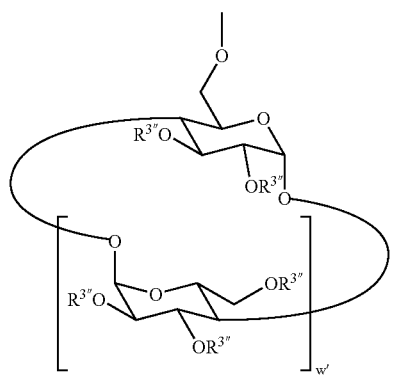

where $R^{3''}$ in each occurrence may be the same or different and represents a hydrogen atom, a univalent radical having one of the meanings assigned to R' or a bivalent radical having one of the meanings assigned to $R^{2'}$ and w' is 5, 6 or 7.

$R^{3''}$ is preferably a hydrogen atom, an unsubstituted or amine-, carbonyl-, carboxyl- or oxiranyl-substituted uni- or multivalent hydrocarbyl radical, a polyether radical with or without hydroxyl, mercapto, amine, ammonium, carbonyl, carboxyl, oxiranyl or reactive sulfonic acid derivative group substitution, or a halotriazine-functional radical. Particular preference is given to hydrogen atom, univalent alkyl, acetyl, amino-, epoxy-, vinylsulfonyl-, 2-sulfooxyethylsulfonyl-, 2-chloroethylsulfonyl- and (meth)acryloyl-functional alkyl or polyether radical and also halotriazine-functional radical, especially hydrogen atom, methyl, ethyl, propyl, acetyl, β-aminoethyl, β-(N-methyl)aminoethyl, γ-aminopropyl, γ-(N-tert-butyl)-amino-2-hydroxypropyl, γ-(N-cyclohexyl)amino-2-hydroxypropyl, glycidoxypropyl, 3-(vinylsulfonyl)propyl, vinylsulfonyl, (2-sulfooxyethyl)sulfonyl, (2-chloroethyl)sulfonyl, p-vinylsulfonylphenyl, p-(2-sulfooxyethyl)sulfonylphenyl, ω-vinylsulfonoylpolyoxypropyl, acryloyl, 2-(N-acrylamido)ethyl, 3-(N-acrylamido)-propyl, 2-hydroxy-3-methacryloyloxypropyl and also 4-chloro-6-ONa-triazinyl being preferred.

Examples of $R^{2'}$ are the examples assigned above to $R^{2}$ above. $R^{2'}$ is preferably —$C_3H_6$—O—$CH_2$—CHOH—$CH_2$-, —$C_3H_6$—NH—$CH_2$CHOH—$CH_2$—O—$C_3H_6$—, —$C_3H_6NHC_2H_4NHCH_2CHOHCH_2OC_3H_6$—, substituted or unsubstituted triazinylene, for example iminopropyl- or iminoethylaminopropyl-substituted triazinylene, and 2-ONa-triazinyl-1,4-ene, particular preference being given to iminoethylaminopropyl-substituted triazinylene radicals.

The organosilicon compounds (B) used according to the present invention preferably have an average molecular weight $M_w$ of at least 1000 g/mol and more preferably in the range from 2000 to 50,000 g/mol.

Component (B) used according to the present invention is preferably liquid at room temperature, i.e., at 20° C. When component (B) is a siloxane, a 20° C. viscosity of 100 to 10,000 $mm^2/s$ is preferred. more preferably in the range from 200 to 4000 $mm^2/s$.

When component (B) used according to the present invention is an organosiloxane, it is preferably a linear organosiloxane.

Examples of component (B) used according to the present invention are the species described in the operative examples, with the difference that these, instead of the trimethylsiloxy end groups, have such end groups that the compound has in either case at least two hydrolyzable or condensation-capable groups.

Component (B) used according to the present invention can be prepared by any desired processes, for example as described above.

When component (B) is a silane, it is preferably used in the form of an aqueous solution.

When component (B) is a siloxane, it is preferably used in the form of an emulsion. The emulsion in question can be a customary emulsion which can be produced in a conventional manner with the assistance of suitable emulsifiers. Examples of suitable emulsifiers are alkylphenol ethoxylates or fatty alcohol ethoxylates. When component B is used in the form of an emulsion, the solids content of the emulsion can be almost freely choosable, and typically the solids content of such emulsions is between 15 and 55 percent by weight.

The compositions of the present invention comprise component (B) in amounts of preferably 2 to 60 parts by weight and more preferably 20 to 50 parts by weight, all based on 100 parts by weight of organopolysiloxane (A).

The optional catalysts (D) for inclusion in the compositions of the present invention can be any desired compounds previously used as catalysts in condensation-crosslinkable compositions.

Examples of optional catalysts (D) are metal compounds, such as butyl titanates and organotin compounds, an example being dioctyltin diacetate, and also carboxylic acids.

When the compositions of the present invention comprise condensation catalysts (D), the amounts involved preferably range from 0.01 to 10.0 parts by weight, more preferably from 0.1 to 10.0 parts by weight and especially from 0.5 to 5.0 parts by weight, all based on 100 parts by weight of organopolysiloxane (A).

As well as the above-described components (A), (B) and optionally (D), the compositions of the present invention may comprise further materials, such as crosslinkers (C), and this is preferred.

Examples of crosslinkers include dialkoxyaminosilanes, trialkoxyaminosilanes and their partial hydrolyzates, emulsions of organopolysiloxane with Si-attached hydrogen or their equilibrates.

When the compositions of the present invention comprise crosslinkers (C), the amounts involved preferably range from 0.1 to 10 parts by weight, based on 100 parts by weight of organopolysiloxane (A).

The compositions of the present invention preferably comprise:

(A) organopolysiloxane of the formula (I'),
(B) cyclodextrinyl-containing organosilicon compound comprising units of the formula (II'),
(C) crosslinker and also if appropriate
(D) catalyst.

The compositions of the present invention more preferably consist of
(A) 100 parts by weight of organopolysiloxane of the formula (I'),
(B) 20 to 60 parts by weight of a cyclodextrinyl-containing organosilicon compound comprising units of the formula (II'), and
(C) 1 to 10 parts of a crosslinker selected from di- and trialkoxyaminosilane and its partial hydrolyzates.

The individual constituents of the compositions according to the present invention may each be one variety of such a constituent and also a mixture of at least two different varieties of such constituents.

The compositions of the present invention can be produced by mixing all constituents of the particular composition neat or in emulsion form, preferably in emulsion form, with each other in any desired order. This mixing can take place at room temperature and the pressure of the ambient atmosphere, i.e., about 900 to 1100 hPa. If desired, mixing can also be done at higher temperatures, for example at temperatures in the range from 35 to 90° C.

The crosslinkable compositions of the present invention have the advantages that they are simple to produce, and that they are easily handlable and are stable in storage at room temperature, in emulsion form in particular.

The compositions of the present invention can be crosslinked in a conventional manner by thermal activation.

The temperatures at which the crosslinking of the compositions according to the present invention is carried out are preferably in the range from 100 to 200° C., more preferably in the range from 120 to 190° C., and especially in the range from 140 to 160° C. Crosslinking is preferably carried out at a pressure in the range from 100 to 1100 hPa and especially at the pressure of the ambient atmosphere.

When the compositions of the present invention are emulsions or aqueous solutions, drying is subsumed in the crosslinking operation. As is customary in industry, drying/condensation usually takes place online after application.

The compositions of the present invention can be used for all purposes for which organopolysiloxane compositions which crosslink to form elastomers can be used.

The compositions of the present invention are especially useful for finishing organic fibers, preferably textile materials, and leather and more preferably for finishing nonwovens and fiberfill fibers composed of materials such as for example polyethylene terephthalate, polypropylene or cellulosic fiber.

The present invention further provides a process for treating organic fibers, characterized in that compositions according to the present invention are applied to, and left to crosslink on, the fibers to be treated.

The crosslinkable composition of the present invention is preferably applied to the fibers to be treated in emulsion form or aqueous solution and allowed to crosslink after removal of water.

The process of the present invention involves wetting the organic fibers to be treated and especially fiberfill fibers to be treated, preferably while they are still in the form of filaments, by spraying or dipping with aqueous treatment liquors comprising compositions according to the present invention. The silicone concentration on the fiber can be controlled through the concentration of the components in the treatment liquor and also through the wet pickup. The treatment can take place before, in or after the crimper where the filament is curled or given a zigzag shape. Drying and crosslinking then take place in a downstream dryer. The durations involved are typically 10 to 30 minutes at temperatures between 110 and 190° C. Fiberfill fiber is then preferably produced by cutting the filament to convert it into a staple fiber.

When the present invention's introduction of cyclodextrinyl-containing organosilicon compounds to the textile is intended to achieve semipermanent application of fragrance chemicals, the loading of the cyclodextrin with the fragrance chemical can already be carried out in the aqueous medium in the course of the production of the compositions according to the present invention. The nonwovens or fiberfill fibers finished according to the present invention advantageously possess pleasant softness and resilience and are capable of storing perfumes and fragrance chemicals for a prolonged period, only releasing these in a gradual and controlled manner after coming under the action of body heat and moisture. When unloaded cyclodextrins are applied or after the fragrance chemicals have been released, thus finished fibrous materials, nonwovens or woven/loop-formingly knitted fabrics are capable of absorbing odors and thus of bringing about a freshness effect. Instead of fragrance chemicals it is of course also possible for other active-component chemicals, such as conditioning or insect-repelling agents, to be incorporated in the cyclodextrins as guest molecules in a known manner.

The compositions of the present invention have the advantage that they are specifically formed only on the fibrous substrates to be finished.

The substrates treated with the compositions of the present invention have the advantage of possessing a nice, skin-friendly softness.

The substrates treated with the compositions of the present invention further have the advantage that not only the effects known to be achievable with cyclodextrins but also a softening and resiliency-promoting silicone effect can be achieved.

The present invention's process for treating organic fibers has the advantage that cyclodextrins can be fixed in a simple manner even to nonreactive fibers, such as polyester or polypropylene, so as to be durable to washing.

In the examples which follow, parts and percentages are by weight, unless otherwise stated. The examples which follow are carried out, unless otherwise stated, at a pressure of the ambient atmosphere, i.e., at about 1000 hPa, and at room temperature, i.e., about 20° C., or a temperature which results when the reactants are added together at room temperature and no additional heating or cooling is applied. Viscosities reported in the examples relate to a temperature of 25° C.

Amine number shall be understood as referring to the number of ml of 1N HCl required to neutralize 1 g of substance.

EXAMPLE 1

100 g of an aminoalkyl-functionalized trimethylsilyl-terminated silicone oil identified below are placed as an initial charge in a glass beaker. An Ultra-Turrax (Janke & Kunnel, IKA Labortechnik Ultra-Turrax T 50, 1100 W, 10 000 rpm) is used to disperse the cyclodextrin, dissolved in 1.2 times the amount of water in each case, in the initial charge and agitates the reaction mixture thoroughly for 90 to 120 minutes. In the process, the temperature rises to about 50 to 80° C., depending on the viscosity of the silicone oil used. The remaining residual water is distilled off to leave cyclodextrinyl-containing silicone oils from which no cyclodextrin whatsoever is observed to floc or precipitate out for months. The silicone oils are identified in Table 1.

TABLE 1

| Example | Silicone oil used | Amine number of silicone oil used [mequiv. N/g] | Viscosity of amine oil used [mm²/s] | Amount of cyclodextrin used [% by weight]† | Viscosity of cyclodextrinic silicone oil [mm²/s] |
|---|---|---|---|---|---|
| 1a | A | 0.09 | 300 | 3.4 | 400 |
| 1b | A | 0.09 | 300 | 5.9 | 550 |
| 1c | B | 0.60 | 1200 | 10.0 | 5680 |
| 1d | B | 0.60 | 1200 | 17.5 | 9750 |

†based on total weight of silicone oil used

The cyclodextrin used in Examples 1a-d is

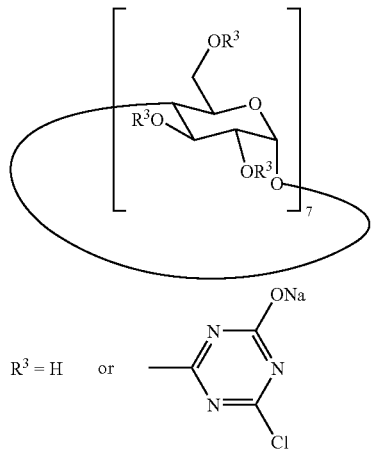

which is commercially obtainable at Wacker-Chemie GmbH, D-Munich under the trade name of CAVASOL® W7 MCT. Siloxanes A and B are described hereinbelow, Me denoting methyl.

Siloxane A:

$Me_3SiO(Me_2SiO)_{145}(MeSiO)SiMe_3$

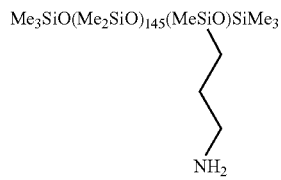

Siloxane B:

$Me_3SiO(Me_2SiO)_{80}(MeSiO)_2SiMe_3$

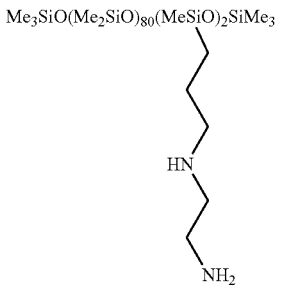

EXAMPLE 2

100 g of a trimethylsilyl-terminated silicone oil are placed as an initial charge in a glass beaker. The silicone oils are identified in Table 2. An acentric dissolver system (Molteni, Labmax, 6000 rpm) is used in Examples 2b-e to disperse in the initial charge the amount of auxiliary base which is equivalent to the number of acidic hydrogen groups of the silicone oil used, for 5 minutes. Thereafter, the Table 2 amount of cyclodextrin, dissolved in 1.2 times the amount of water in each case, is added and worked in for 90 to 120 minutes. The remaining residual water is distilled off to leave cyclodextrinyl-containing silicone oils from which no cyclodextrin whatsoever is observed to floc or precipitate out for months.

TABLE 2

| Example | Silicone oil used | Viscosity of silicone oil used [mm²/s] | Amount of cyclodextrin used [% by weight]† | Viscosity of cyclodextrinic silicone oil [mm²/5] |
|---|---|---|---|---|
| 2a | C | 5300 | 5 | 6350 |
| 2b | D[a)] | 50 | 10 | 1350 |
| 2c | E[a)] | 13600 | 5 | 15000 |
| 2d | F[a)b)] | 150 | 2.5 | 1280 |
| 2e | G[c)] | 900 | 5 | 3050 |

†based on total weight of silicone oil used
a) auxiliary base: triethylamine
b) 50% aqueous solution; add CD as a solid
c) auxiliary base: ᵗBuOK The cyclodextrin used in Examples 2a-e is described in Example 1. Siloxanes C to G are described in what follows, Me denoting methyl.

Siloxane C:

$Me_3SiO(Me_2SiO)_{200}(MeSiO)_4SiMe_3$

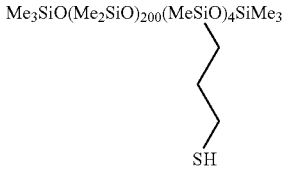

-continued

Siloxane D:

Me₃SiO(Me₂SiO)₇(MeSiO)₂SiMe₃

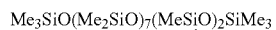

Siloxane E:

Me₃SiO(Me₂SiO)₁₅₀(MeSiO)₃SiMe₃

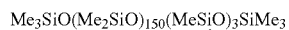

Siloxane F:

Me₃SiO(Me₂SiO)₁₂(MeSiO)₃SiMe₃

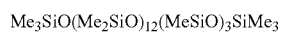

Siloxane G:

Me₃SiO(Me₂SiO)₁₅₀(MeSiO)₃SiMe₃
  \
   (CH₂)₁₀
  /
COOH

EXAMPLE 3

To 100 g of an emulsion consisting of –17.5% by weight of aminoethylaminopropyl-functionalized organopolysiloxane having trimethylsilyl end groups and an average chain length of about 150 and also the amine number reported in Table 3 and about –10% by weight of ethoxylated fatty acid having a chain length distribution between 12 and 18 carbon atoms and also –72.5% by weight of water is added in each case at room temperature the Table 3 amount of cyclodextrin, dissolved in 1 g of water in each case, with stirring. The emulsion obtained in each case is then stored at room temperature for 7 days and subsequently broken with 20% sodium chloride solution. The cyclodextrinyl-containing silicone oil thus obtained is subsequently washed 10 times with 100 g of 20% NaCl solution each time. The remaining residual water is distilled off to leave cyclodextrinyl-containing silicone oils from which no cyclodextrin whatsoever is observed to floc or precipitate out for months.

TABLE 3

| Example | Amine number of silicone oil emulsion | Amount of cyclodextrin used | Cyclodextrin content relative to amine content |
|---------|----------------------------------------|------------------------------|------------------------------------------------|
| 3a | 0.6 | 390 mg | 5% |
| 3b | 0.2 | 390 mg | 15% |

The cyclodextrin used in Examples 3a and 3b is described in Example 1.

EXAMPLE 4

100 g of a silicone oil described in Example 1 (aminopropyl functionalized, trimethylsilyl terminated) are dissolved in 250 ml of dimethyl sulfoxide. A solution of 5.3 g of the cyclodextrin described in Example 1 in 25 ml of dimethyl sulfoxide is added to the solution. The reaction mixture is heated to 80° C. for one hour. The solvent is subsequently distilled off at 80° C. under full vacuum to leave a cyclodextrinyl-containing silicone oil which has a viscosity of 500-600 mm²/s and from which no cyclodextrin whatsoever is observed to floc or precipitate out for months.

EXAMPLE 5

100 g of the silicone oil described as siloxane G in Example 2 (undecanoic acid functionalized, terminated with trimethylsilyl groups) are suspended in 250 ml of dimethyl sulfoxide, admixed with an amount of KOH equivalent to the carboxyl groups and stirred at room temperature for 30 minutes. A solution of 4.1 g of the cyclodextrin described in Example 1 in 20 ml of dimethyl sulfoxide is added and the reaction mixture is heated to 80° C. for one hour. The solid formed (KCl) is subsequently removed by filtration and the solvent is removed by distillation at 80° C. under full vacuum to leave a cyclodextrinyl-containing silicone oil which has a viscosity of 1030 mm²/s and from which no cyclodextrin whatsoever is observed to floc or precipitate out for months.

EXAMPLE 6

100 g of an aminoalkyl-functionalized trimethylsilyl-terminated silicone oil of the hereinbelow more particularly identified variety are placed as an initial charge in a glass beaker. The Ultra-Turrax described in Example 1 is used to disperse the Table 4 amount of cyclodextrin derivative, dissolved in 1.2 times the amount of water in each case, in the initial charge and shall give the reaction mixture a thorough working through for 90 to 120 minutes. In the process, the temperature rises to about 50 to 80° C., depending on the viscosity of the silicone oil used. The remaining residual water is distilled off to leave cyclodextrinyl-containing silicone oils from which no cyclodextrin whatsoever is observed to floc or precipitate out for months.

TABLE 4

| Example | Silicone oil used | Amine number of silicone oil used [mequiv. N/g] | Viscosity of amine oil used [mm²/s] | Amount of cyclodextrin used [% by weight]† | Viscosity of cyclodextrinic silicone oil [mm²/s] |
| --- | --- | --- | --- | --- | --- |
| 6a | C | 0.86 | 300 | 2 | 625 |
| 6b | D | 0.62 | 950 | 2 | 3530 |

†based on total weight of silicone oil used

The cyclodextrin used in Examples 6a and 6b is

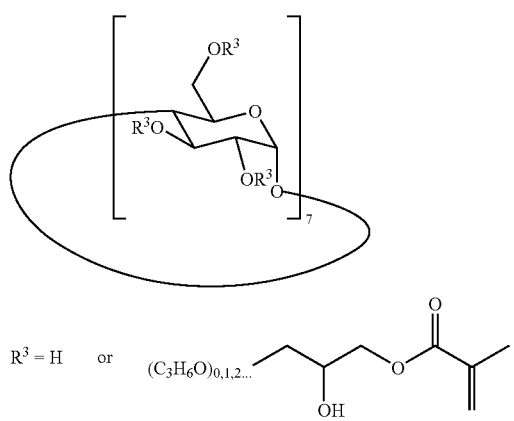

which is obtainable as "BETA W7 MAHP 0.1/0.4" from Wacker-Chemie, D-Munich and contains on average 0.9 molecules of methacrylate per molecule of cyclodextrin. Siloxanes C and D are described in what follows, Me denoting methyl.

Siloxane C:

$Me_3SiO(Me_2SiO)_{40}(MeSiO)_3SiMe_3$

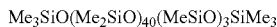
NH$_2$

Siloxane D:

$Me_3SiO(Me_2SiO)_{120}(MeSiO)_3SiMe_3$

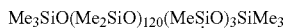
HN
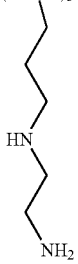
NH$_2$

EXAMPLE 7

100 parts of a monochlorotriazinyl-functional β-cyclodextrin (commercially available at Wacker-Chemie GmbH, D-Munich under the designation of CAVASOL® W 7 MCT) were dissolved in 700 parts of distilled water and the solution was adjusted to pH 5 with citric acid. 7 parts of perfume oil (commercially available from Cosmaderm D-Ladenburg under the designation of Black Magic Y5) were added with stirring. The water-insoluble perfume oil becomes entrapped in the cyclodextrin and so disappears from the aqueous solution. The solution was admixed with 80 parts of a microemulsion comprising 17 parts of a linear hydroxydimethyl-terminated dimethyl/methyl, aminoethylaminopropyl siloxane of amine number 0.6 and viscosity 1000 mm²/s and also 6.6 parts of emulsifiers (iso-C13 fatty alcohol×5-8 EO) (microemulsion is commercially available at Wacker-Chemie GmbH, D-Munich under the designation of Finish 46016 VP) and stirred for 10 minutes.

The cyclodextrinyl-containing organopolysiloxane obtained in emulsion form has a residual amine number of 0.08 and good performance characteristics as a softener and a long-lasting fragrance note.

0.65 kg of the emulsion thus obtained was pad-mangled onto 1 kg of a woven blend fabric composed of 98% wool and 2% elastane fiber (spandex) with a wet pickup of 65%. The fabric was subsequently dried, initially for 3 minutes at 90° C. and then for 3 minutes at 150° C.

The textile substrate thus treated has a pleasant hand and is capable of storing the encapsulated perfume oil for several months, but also of releasing it a little at a time when subjected to the concurrent action of body heat and moisture, i.e., under wear conditions.

EXAMPLE 8

The procedure reported in Example 1 is repeated except that the perfume oil used was 8 parts of rose oil (commercially obtainable at Kurt Kitzing, D-Wallerstein under the designation of "Typ 131650"). The rose oil was applied to loop-formingly knitted cotton fabric for processing into T-shirts. The textile substrate was characterized by a fragrance note which lasted for months.

EXAMPLE 9

100 parts of monochlorotriazine-functional β-cyclodextrin (commercially available at Wacker-Chemie GmbH, D-Munich under the name of CAVASOL® W 7 MCT) were dissolved in 800 parts of water and adjusted to pH 5 with citric acid. The solution was admixed with 7 parts of perfume oil (commercially available at Cosmaderm, D-Ladenburg under the designation of Fragrance Patricia Y) and stirred for 5 minutes. After this time had elapsed, the perfume oil had become entrapped in the cavities of the cyclodextrin despite the water insolubility of the perfume oil, and had visually disappeared from the aqueous system. The solution was admixed with 30 parts of a 35% emulsion of an amine oil of viscosity 4000 mm²/s and amine number 0.15 (aminoethylaminopropyl-functional silicone) and also 5 parts of emulsifier (C13 fatty alcohol ethoxylate) 0.3 part of polyalkoxyoligosiloxane crosslinker and 0.5 part of catalyst based on dialkyltin dilaurate (commercially obtainable at Wacker-Chemie GmbH, D-Munich under the designation of Finish CT 45 E). The treatment liquor was pad-mangled onto a 98:2 cotton/elastane twill fabric with a wet pickup of 70% and dried for 3 minutes at 90° C. and also for 3 minutes at 150° C. to leave a fabric having a pleasant hand and a long-lasting fragrance note.

EXAMPLE 10

The procedure described in Example 9 is repeated except that 6 parts of Citral 54450 from Drohm, Germany are used as perfume oil. The result was a textile substrate having a pleasant fragrance of freshness.

If a garment finished according to Examples 7 to 10 is worn for a prolonged period, the entire fragrance will be gradually released. The garment can then be subjected to a normal domestic wash. During tumble drying, renewed filling of the cyclodextrin cavities with perfume oil is possible by adding the perfume to the tumble dryer. This proves that the cyclodextrin aminosilicone substrate complex was fixed on the textile substrate so as to be durable to washing.

Crosslinkable Compositions

EXAMPLE 11

Preparation of Component (B1)

1560 parts of a monochlorotriazine-functional β-cyclodextrin (commercially available at Wacker-Chemie GmbH, D-Munich under the trademark of CAVASOL® W7 MCT) were dissolved in 3000 parts of water and adjusted to pH 5 with citric acid. The solution was admixed with 222 parts of trimethoxyaminopropylaminoethylsilane (commercially available at Wacker-Chemie GmbH, D-Munich under the designation of "Silan GF 91") and stirred at room temperature for 10 minutes. The monochlorotriazine radical reacts with the primary amine group of the aminosilane by nucleophilic substitution. The reaction solution thus obtained can be used directly as an aqueous component B.

Preparation of Component (B2)

1560 parts of a monochlorotriazine-functional β-cyclodextrin (commercially available at Wacker-Chemie GmbH, D-Munich under the trademark of CAVASOL® W7 MCT) were dissolved in 2000 parts of water and adjusted to pH 5 with citric acid. The solution was admixed with 159 parts of diethoxy(methyl)aminopropylsilane (commercially available at Degussa AG, Germany under the designation of "Dynasilan 1505" and stirred at room temperature for 10 minutes. The reaction solution thus obtained can be used directly as an aqueous component B.

Preparation of Component (B3)

100 parts of a monochlorotriazine-functional β-cyclodextrin (commercially available at Wacker-Chemie GmbH, D-Munich under the trademark of CAVASOL® W7 MCT) were dissolved in 700 parts of water and adjusted to pH 5 with citric acid. The solution was admixed with 180 parts of a microemulsion (commercially available at Wacker-Chemie GmbH, D-Munich under the designation of Finish 46016 VP) and stirred for 15 minutes for reaction. The microemulsion mentioned consists of 17 parts of aminoethylaminopropyl-functional silicone oil of amine number 0.6 and viscosity 1000 mm$^2$/s having Si(CH$_3$)$_2$OH end groups, 6.6 parts of emulsifier (C13 fatty alcohol with 8 EO) and water, the emulsion having been adjusted to pH 5.5 with acetic acid.

a) 20 g of the above-prepared component B1 and 20 g of a 50% emulsion of an SiOH-terminated dimethylpolysiloxane of oil viscosity 100,000 mm$^2$/s, formed by emulsion polymerization, were dissolved in 11 of distilled water and 2 g of aminopropyltriethoxysilane crosslinker were added. This liquor was used to drench 1 kg of polyester fiberfill (Trevira® type 292, 6.7 dtex, 60 mm staple length from Trevira AG, Germany) before specific squeezing off to a wet pickup of 100%. The silicone add-on was thus about 0.19% (amount of crosslinkable composition). The fiberfill fibers were dried and cured for 5 minutes at 1500° C. and subsequently for 5 minutes at 190° C. This produced a soft, springily elastic fiberfill fiber which may for example have fragrance material applied to it and has odor-binding properties.

b) The procedure described under a) is repeated except that 25 g of component B2 were used instead of 20 g of component B1. The silicone add-on was thus about 0.23% (amount of crosslinkable composition).

This produced a soft, springily elastic fiberfill fiber which may for example have fragrance material applied to it and has odor-binding properties.

c) The procedure described under a) is repeated except that 70 g of component B3 were used instead of 20 g of component B1. The silicone add-on was thus about 0.2% (amount of crosslinkable composition). This produced a soft, springily elastic fiberfill fiber which may for example have fragrance material applied to it and has odor-binding properties.

EXAMPLE 12

60 g of an amino-functional softener consisting of an emulsion comprising 35% of a reactive, i.e., Si(CH$_3$)$_2$OH-terminated, amine oil of viscosity 1000 mm$^2$/s and amine number 0.3 (commercially available at Wacker-Chemie GmbH, D-Munich under the designation of Finish CT 78 B) and also 20 parts of component B2 were diluted with deionized water to 500 ml. 2 g of trimethoxyaminoethylaminopropylsilane crosslinker (commercially available at Wacker-Chemie GmbH, D-Munich under the designation of "Silan GF 91") were added. The aqueous mixture was admixed with 4 g of perfume oil (commercially available from Cosnaderm Germany under the designation of Fragrance Lavender-Y) by stirring. The water-insoluble perfume oil disappears from the liquor since it becomes entrapped in the cyclodextrin residue. The liquor was sprayed onto a fiberfill web with a wet pickup of 10%, corresponding to a silicone add-on of 0.45%. The web was subsequently dried at 130° C. for 30 minutes.

This produced a soft, springily elastic web having a marked, long-lasting, pleasant fragrance note. Applied as an interlining, it exhibited odor-binding properties after the fragrance materials had been released.

EXAMPLE 13

A liquor comprising 20 g of an emulsion of an amino-functional SiOH-terminal polydimethylsiloxane (commercially available at Wacker-Chemie GmbH, D-Munich under the designation of Finish CT 78 E) and 200 g of component B 3 were diluted to one liter with deionized water. 0.2 g of polyalkoxyoligosiloxane crosslinker (commercially available at Wacker-Chemie GmbH, D-Munich under the designation of "V 42") and 0.25 g of a 25% emulsion of dioctyltin dilaurate catalyst (commercially available at Wacker-Chemie GmbH, D-Munich under the designation of "C 38") were added.

This liquor was pad-mangled onto knit polyester fabric. Pad-mangled refers to the textile being dipped into a treatment bath, preferably at room temperature and then passing through a squeeze apparatus consisting of 2 rolls. The dipped fabric was squeezed off to a wet pickup of 65%. The treated textile was subsequently dried at 160° C. for 3 minutes. This produced a soft, elastic bulky fabric having a so-called freshness effect, i.e., odor-binding properties.

We claim:

1. Cyclodextrinyl-containing organosilicon compounds comprising units of the formula $$A_a R_b X_c H_d SiO_{(4-a-b-c-d)/2} \quad (I)$$

where

A each is the same or different and is a radical of the formula $$CD—R^2— \quad (II)$$

where

CD is a mono- or multivalent, derivatized or underivatized cyclodextrin residue, and $R^2$ is a divalent, triazinylene radical, R each is the same or different and is a substituted or unsubstituted hydrocarbyl radical optionally interrupted by oxygen atoms, sulfur atoms and/or nitrogen atoms, X each is the same or different and is a radical of the formula $—OR^1$, where $R^1$ is a hydrogen atom or substituted or unsubstituted hydrocarbyl optionally containing ether oxygen atoms, a is 0, 1 or 2, b is 0, 1, 2 or 3, c is 0, 1, 2 or 3, and d is 0, 1, 2 or 3, with the provisos that:

the sum a+b+c+d is ≦3; and the organosilicon compound has at least one A radical per molecule; in not more than 90% of units of the formula (I), is the sum of a+b+c+d equal to 0;

wherein the cyclodextrin oxygen atom used for the chemical attachment of CD to $R^2$ may be replaced by S, NH or $NR^0$ where $R^0$ has one of the meanings indicated above for R.

2. The cyclodextrinyl-containing organosilicon compound of claim 1, wherein in not more than 50% of the units of formula (I) is the sum of a+b+c+d equal to 0.

3. The cyclodextrinyl-containing organosilicon compound of claim 1, wherein in not more than 30% of the units of formula (I) is the sum of a+b+c+d equal to 0.

4. The cyclodextrinyl-containing organosilicon compound of claim 1, wherein in none of the units of formula (I) is the sum of a+b+c+d equal to 0.

5. The cyclodextrinyl-containing organosilicon compound of claim 1, wherein the triazinviene radical is unsubstituted.

6. The cyclodextrinyl-containing organosilicon compound of claim 1, prepared by reacting
   a) an organosilicon compound containing at least one halotriazine-reactive moiety with
   b) at least one halotriazine-functional, optionally derivatized cyclodextrin.

7. The cyclodextrinyl-containing organosilicon compound of claim 6, prepared by reacting an organosilicon compound with a halotriazine-functional, optionally derivatized cyclodextrin wherein the halotriazine is unsubstituted except for the halo substituent.

8. The cyclodextrinyl-containing organosiicon compound of claim 6, wherein the halotriazine bears at least one substituent selected from the group consisting of iminopropyl, iminoethvlaminopropvl, oxypropyl, mercatopropyl, O-carboxydecyl, and glycosidoxypropvl.

9. A process for the manufacture of cyclodextrinyl-containing organosilicon compounds, comprising reacting
   a) reactants comprising
      a)i) at least one organosilicon compound containing at least one reactive moiety selected from the group consisting of amino, mercapto, hydroxyl, carboxyl, anhydride, glycosido, phenol, polyglycol, phosphonato, and silalactone, with
      a)ii) at least one cyclodextrin or cyclodextrin derivative selected from the group consisting of
         a)ii)1 halotriazine-functional, optionally derivatized cyclodextrins,
         a)ii)2 epoxy-functional, optionally derivatized cyclodextrins,
         a)ii)3 vinylsulfonyl-functional, optionally derivatized cyclodextrins wherein vinylsulfonyl group(s) are optionally derivatized, and
         a)ii)4 (meth)acryloyl-functional, optionally derivatized cyclodextrins,
   or
   b) reactants comprising
      b)i) at least one amino-functional, optionally derivatized cyclodextrin with
      b)ii) at least one reactive organosilicon compound selected from the group consisting of
         b)ii)1) an epoxy-functional polysiloxane, and
         b)ii)2) a (meth)acryloyl-functional organosilicon compound.

10. The process of claim 9, wherein a)i) is reacted with a)ii)1).

11. The process of claim 9, wherein a)i) is reacted with a)ii)2).

12. The process of claim 9, wherein a)i) is reacted with a)ii)3).

13. The process of claim 9, wherein a)i) is reacted with a)ii)4).

14. The process of claim 9, wherein b)i) is reacted with b)ii)1).

15. The process of claim 9, wherein b)i) is reacted with b)ii)2).

16. A process for treating organic fibers, comprising applying to said organic fibers a cyclodextrinyl-containing organosilicon compound of claim 1.

17. A process for treating organic fibers, comprising applying to said organic fibers a cyclodextrinyl-containing organosilicon compound prepared by the process of claim 9.

18. A crosslinkable organosilicon composition, comprising
   (A) at least one organopolysiloxane bearing two or more hydrolyzable or condensable organyloxy groups and/or hydroxyl radicals,
   (B) at least one cyclodextrinyl-containing organosilicon compound having two or more hydrolyzable or condensable organyloxy groups and/or hydroxyl radicals, and/or their partial hydrolyzates or partial condensates,
   (C) optionally one or more a crosslinkers selected from the group consisting of organopolysiloxanes having two or more Si-bonded hydrogen atoms and amino-containing organosilicon compounds bearing two or more organyloxy groups and/or hydroxyl radicals, and
   (D) optionally one or more condensation catalyst(s).

19. The crosslinkable compositions of claim 18, wherein at least one organopolysiloxane (A) has the formula $$(R^{3'}O)_{3-e'}R^{4'}_{e'}SiO—[R^{4''}_2SiO]_f—SiR^{4'}_{e'}(OR^{3'})_{3-e'} \quad (I')$$

where e' is 0, 1 or 2,

R$^{4'}$ are identical or different SiC-attached hydrocarbyl radicals optionally substituted by one or more halogen atoms, amino groups, ether groups, ester groups, epoxy groups, cyano groups or (poly)glycol radicals, said (poly)glycol radicals comprising oxyethylene and/or oxypropylene units, R$^{3'}$ are identical or different, and are a hydrogen atom or R$^{4'}$, f' is an integer from 10 to 100,000, with the proviso that e' can only be 2 when R$^{3'}$ is a hydrogen atom.

20. A crosslinkable composition of claim 18, wherein at least one organosilicon compound (B) comprises units of the formula

  (II')

where

A' are identical or different and are a radical of the formula

  (III')

where

CD' are identical or different monovalent, optionally derivatized cyclodextrin radicals and R$^{2'}$ represents a divalent, optionally substituted hydrocarbyl radical optionally interrupted by oxygen or by mercapto, amine, carbonyl, carboxyl, sulfoxide or sulfonyl group(s), R' are identical or different and are an optionally substituted hydrocarbyl radical optionally interrupted by oxygen atoms and/or nitrogen atoms, X' are identical or different and are radical(s) of the formula-OR$^{1'}$ where R$^{1'}$ is a hydrogen atom or an optionally substituted hydrocarbyl radical optionally containing one or more ether oxygen atoms, a' is 0, 1 or 2, b' is 0, 1, 2 or 3, and c' is 0, 1, 2 or 3, with the provisos that the sum a'+b'+c' is≦4, and the organosilicon compound has at least one A' radical and at least two X' radicals per molecule.

21. A crosslinkable composition of claim 18, comprising:
(A) 100 parts by weight of one or more organopolysiloxane(s) of the formula (I'),
(B) 20 to 60 parts by weight of one or more cyclodextrinyl-containing organosilicon compound(s) comprising units of the formula (II'), and
(C) 1 to 10 parts of one or more crosslinker(s) comprising di- and trialkoxyaminosilane(s) or their partial hydrolyzates.

22. A process for treating organic fibers, comprising applying to said fibers a composition of claim 18.

23. The process of claim 22, further comprising crosslinking said composition.

24. The process of claim 22, wherein cyclodextrin moieties of said cyclodextrinyl-containing organosilicon compound(s) contain a fragrance molecule.

* * * * *